A. & S. HORTON.
TRANSPORTATION SYSTEM.
APPLICATION FILED DEC. 31, 1913. RENEWED JAN. 5, 1918.
1,274,716.
Patented Aug. 6, 1918.
10 SHEETS—SHEET 2.
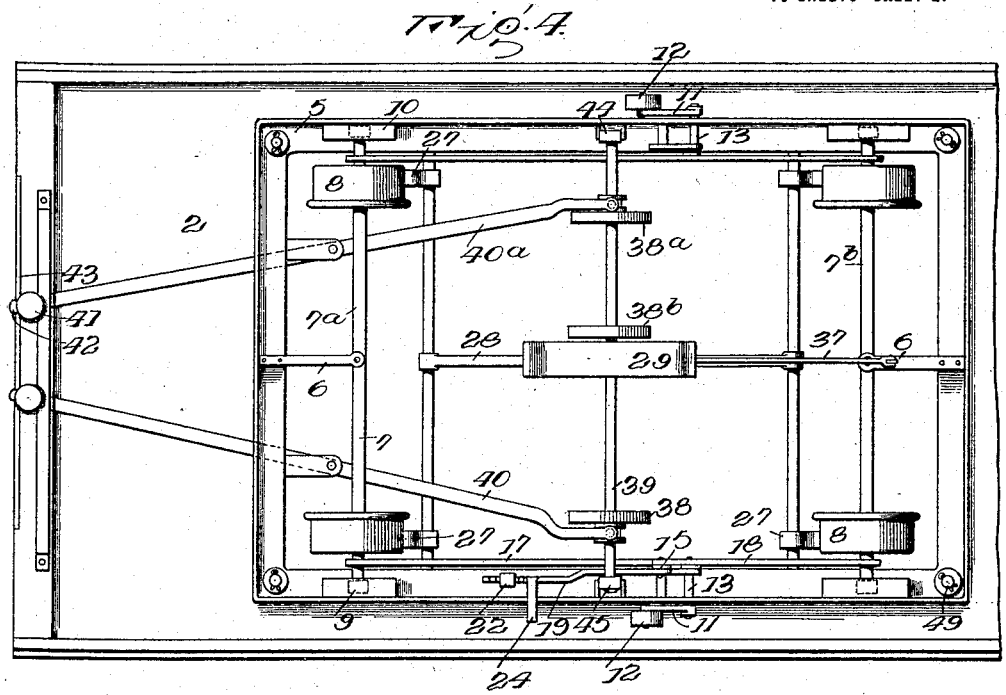
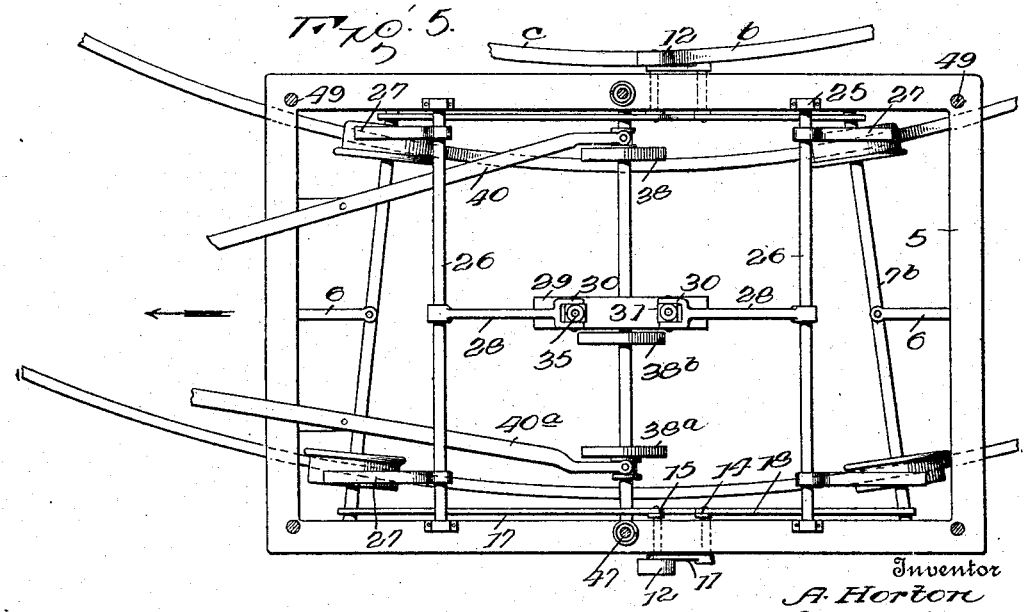

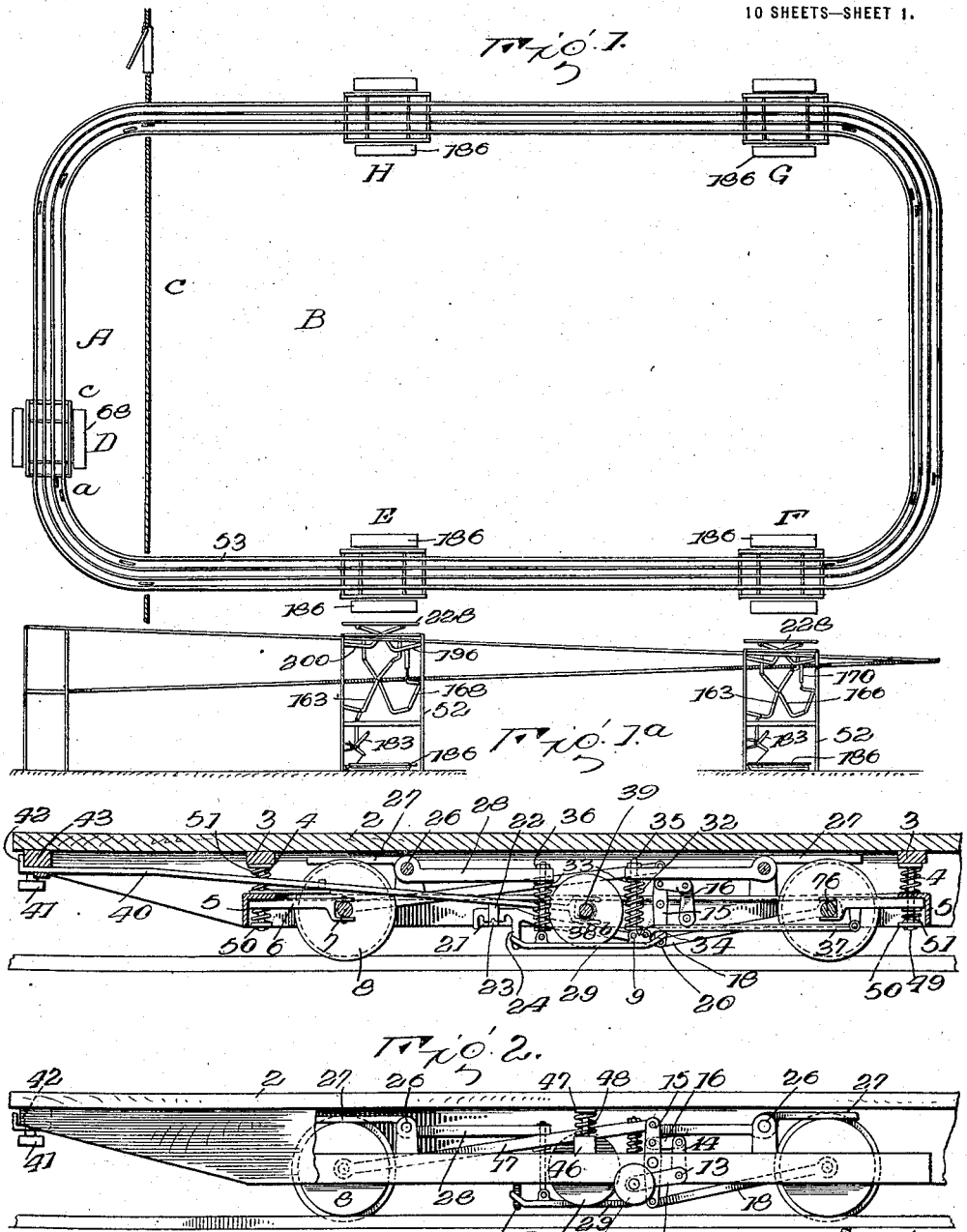

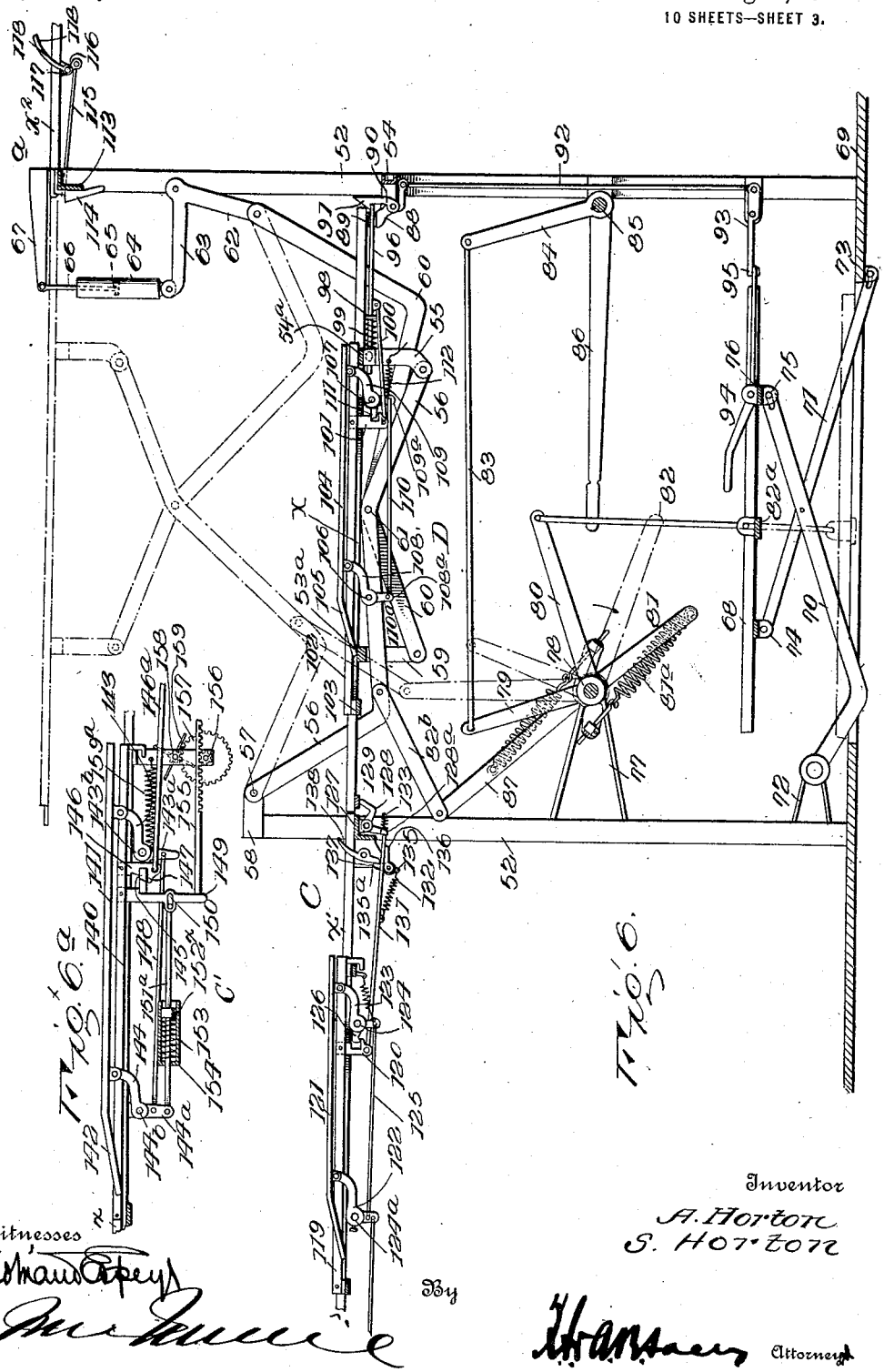

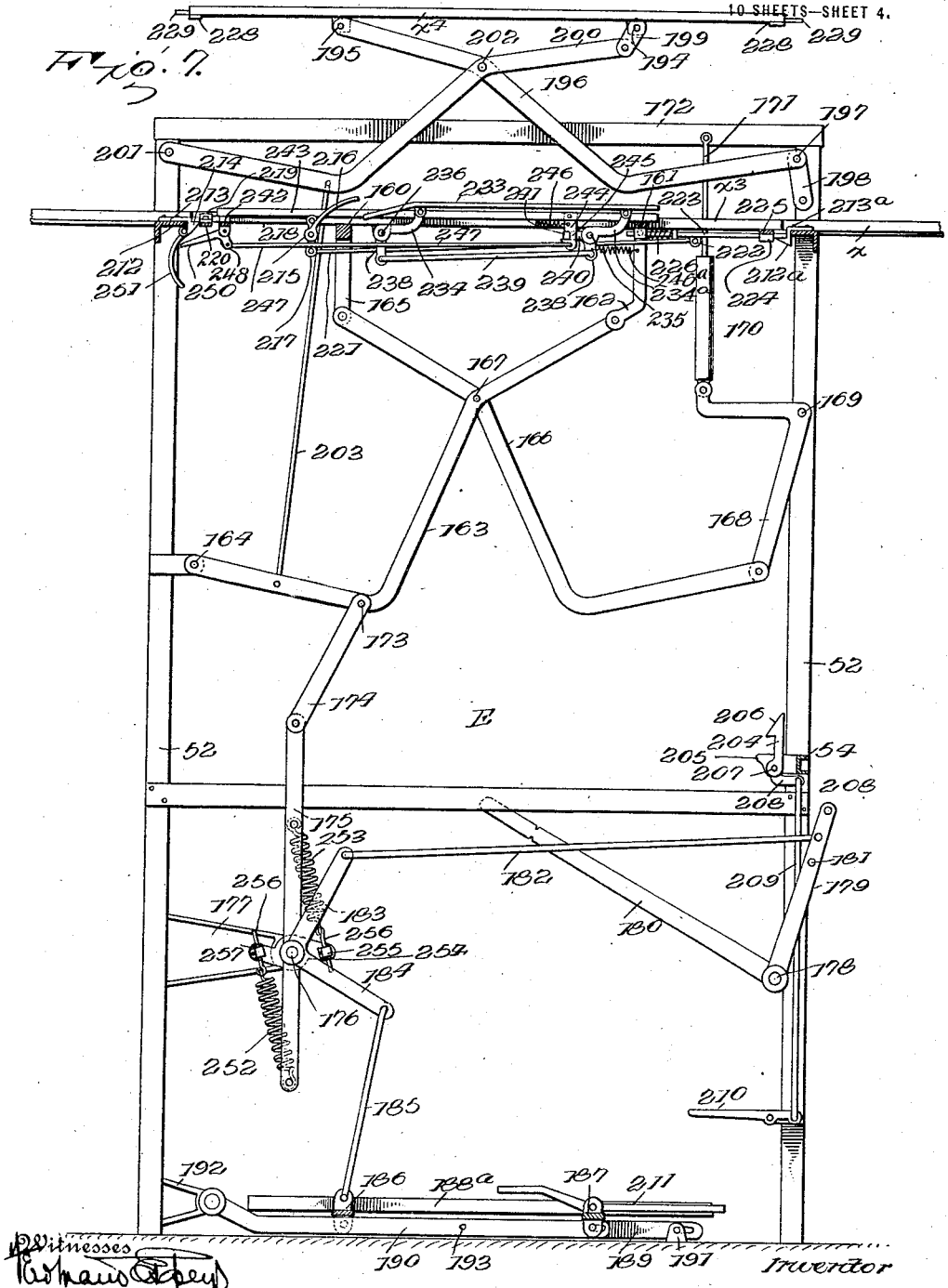

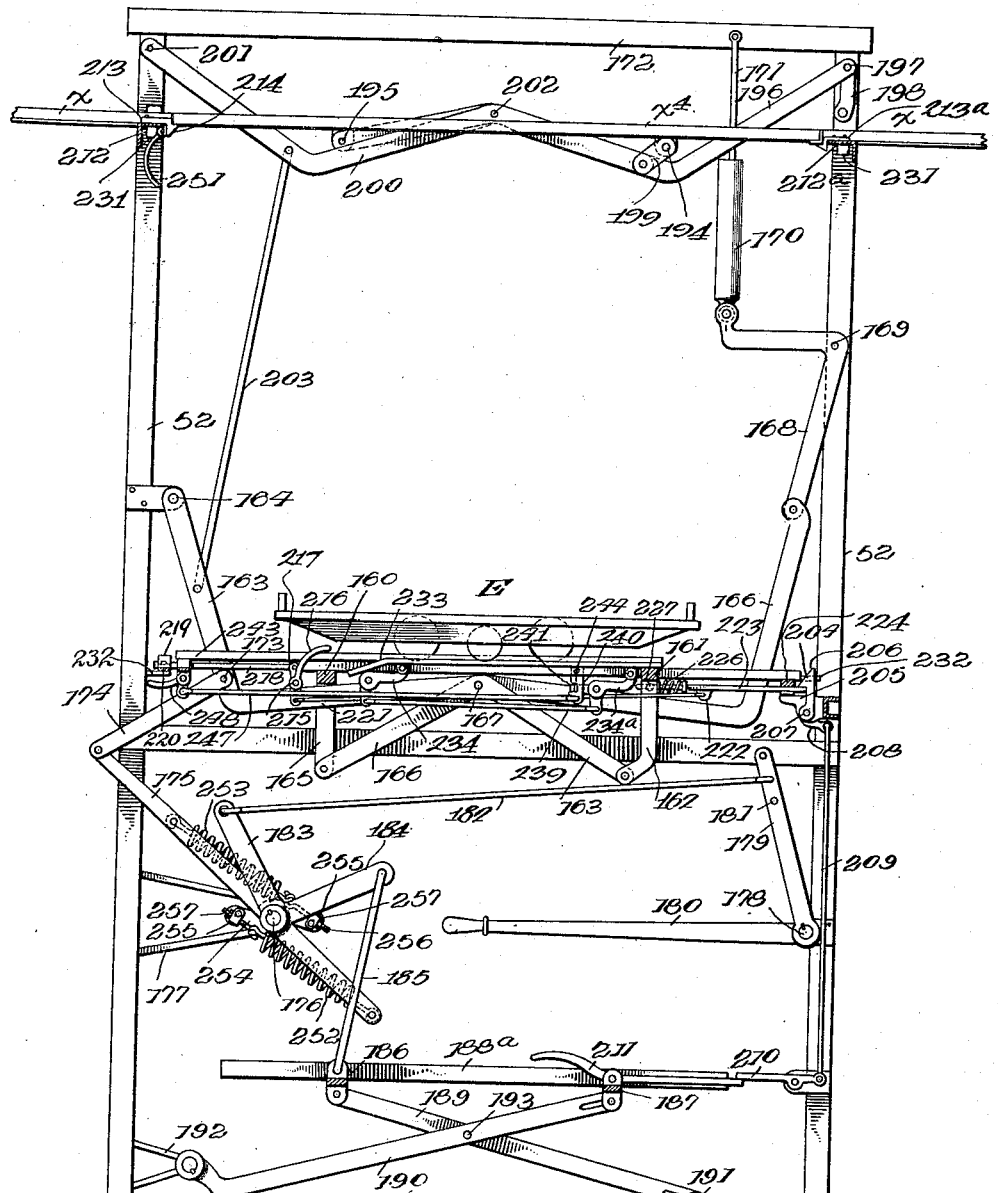

A. & S. HORTON.
TRANSPORTATION SYSTEM.
APPLICATION FILED DEC. 31, 1913. RENEWED JAN. 5, 1918.

1,274,716.

Patented Aug. 6, 1918.
10 SHEETS—SHEET 6.

Inventor
A. Horton
S. Horton

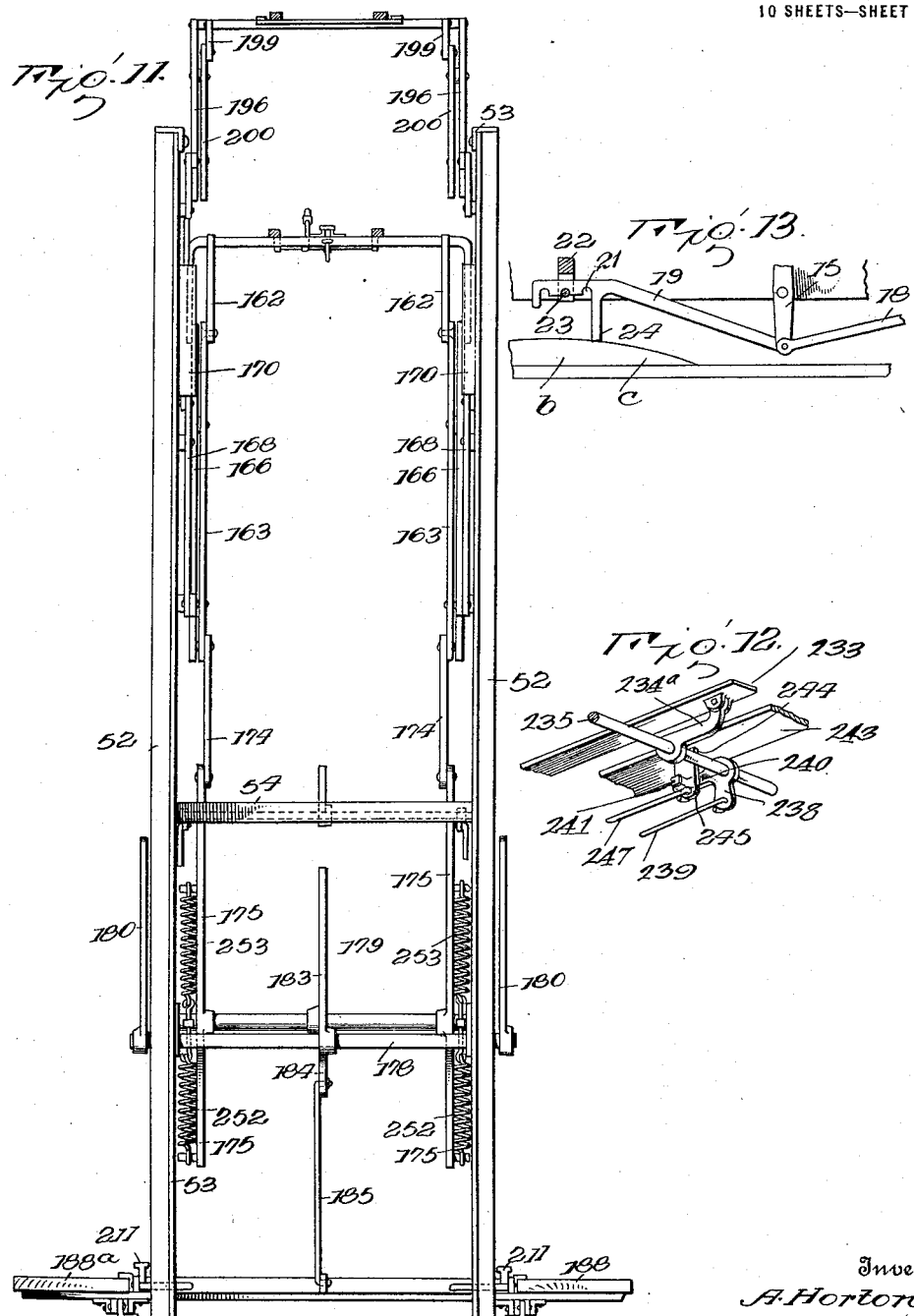

A. & S. HORTON.
TRANSPORTATION SYSTEM.
APPLICATION FILED DEC. 31, 1913. RENEWED JAN. 5, 1918.
1,274,716.
Patented Aug. 6, 1918.
10 SHEETS—SHEET 8.
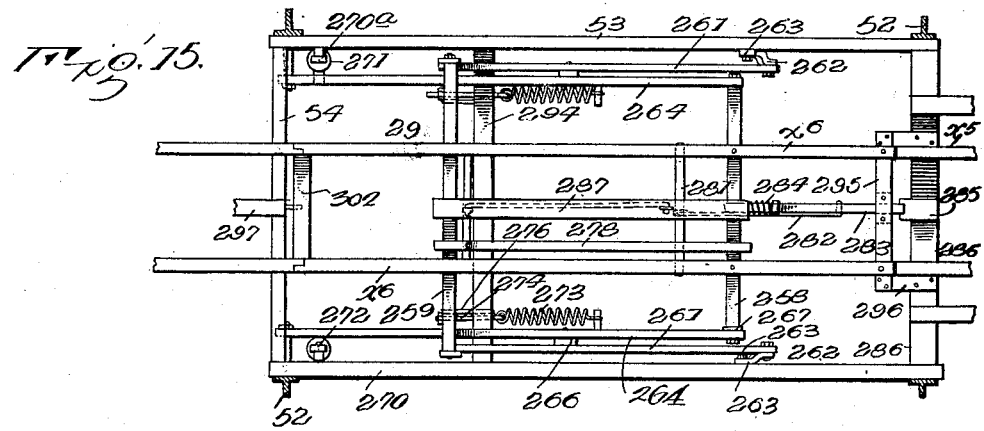
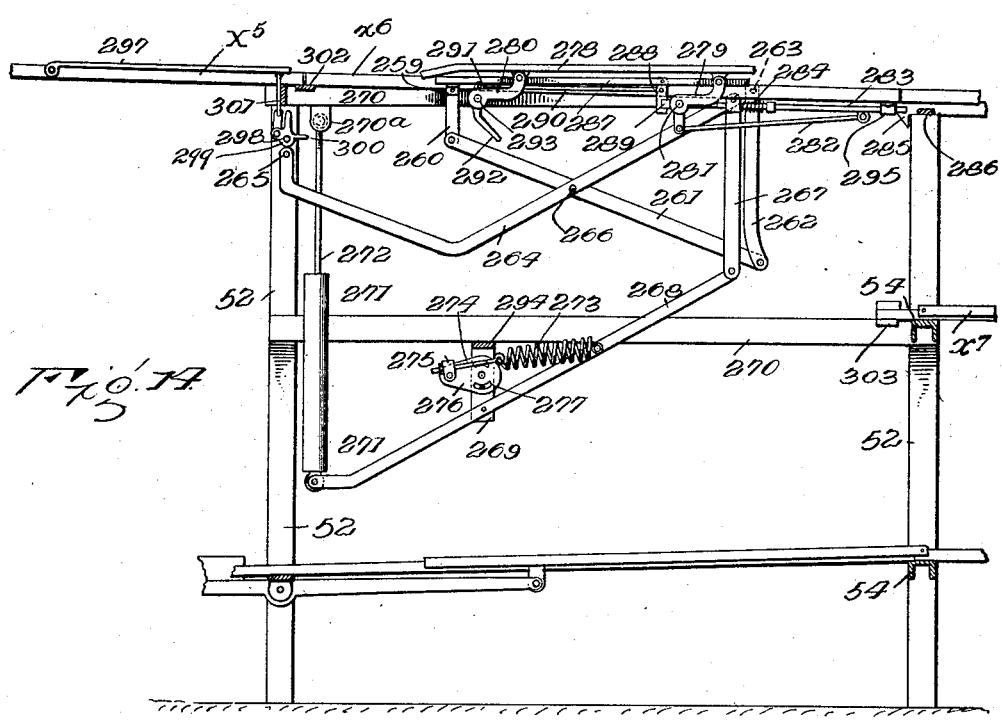

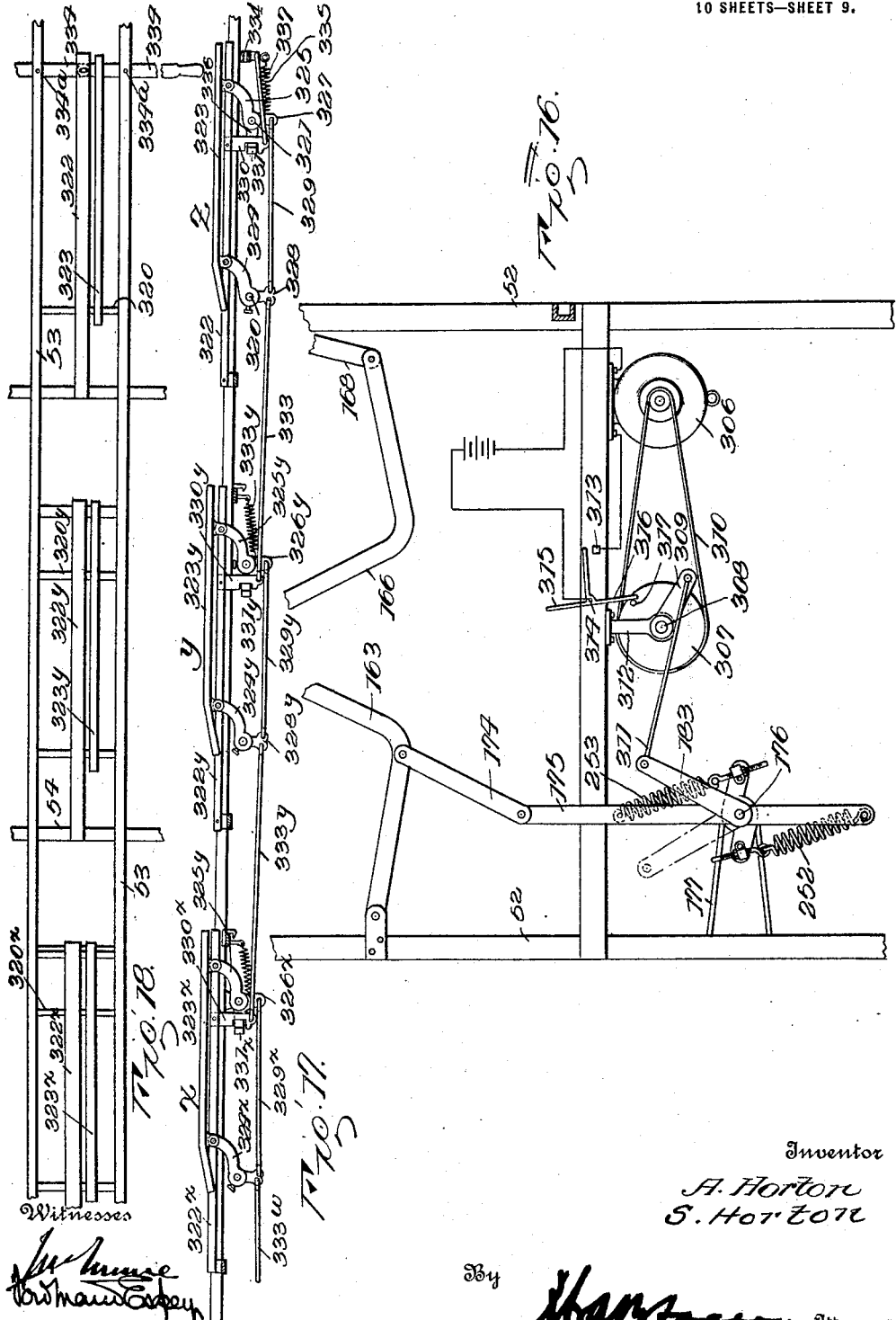

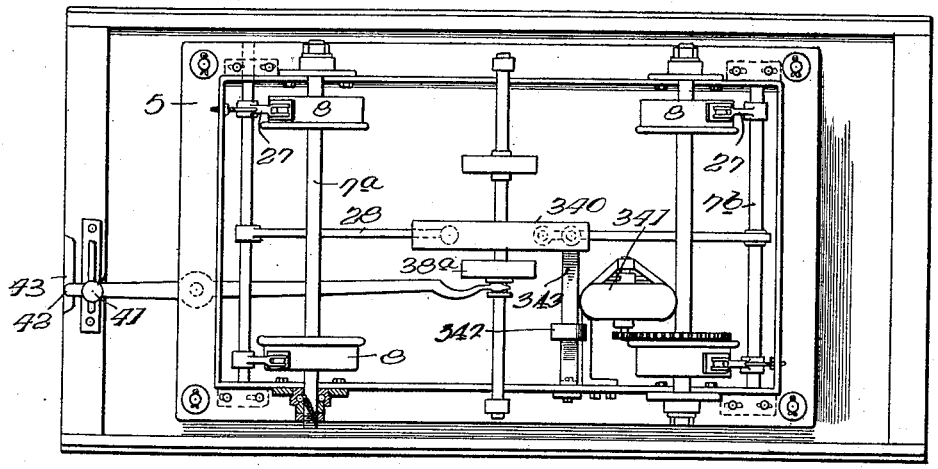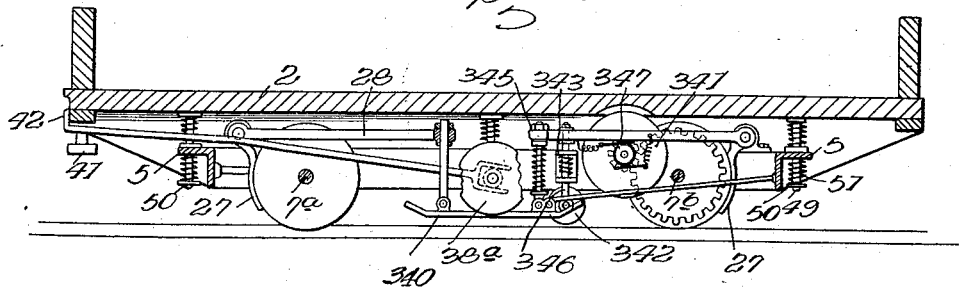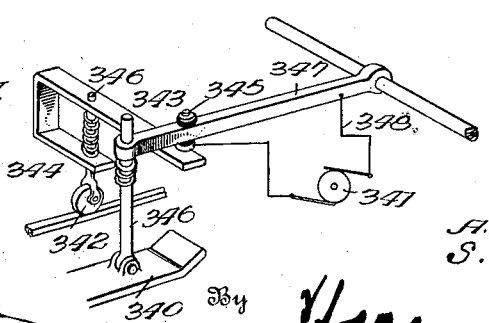

UNITED STATES PATENT OFFICE.

AARON HORTON AND SALYER HORTON, OF COLEMAN, MICHIGAN.

TRANSPORTATION SYSTEM.

1,274,716.   Specification of Letters Patent.   Patented Aug. 6, 1918.

Application filed December 31, 1913, Serial No. 809,710. Renewed January 5, 1918. Serial No. 210,561.

*To all whom it may concern:*

Be it known that we, AARON HORTON and SALYER HORTON, citizens of the United States, residing at Coleman, in the county of Midland and State of Michigan, have invented certain new and useful Improvements in Transportation Systems, of which the following is a specification.

Our invention relates to conveyers or carrier systems and particularly to a system wherein gravity actuated cars are used for running along elevated tracks, this invention being intimately related to the transportation system for which Letters-Patent No. 1,070,472 was granted to Aaron Horton August 19, 1913.

The primary object of our invention is the provision of a carrier system of the character above indicated whereby predetermined cars may be shifted from a higher to a lower level by automatic mechanism disposed upon the car itself and raised from the lower level to a higher level by either manually operated or power operated means.

A further object of the invention is the provision in a system of the character indicated of cars having mechanism thereon capable of being set so as to cause the actuation of car shifting mechanism at predetermined points.

A further object of the invention is the provision in connection with an elevated track of a plurality of elevators located at predetermined points around the track and normally supporting sections of the track, of means disposed upon the cars capable of being set so as to actuate any one of these elevators to cause the lowering of predetermined cars at the point desired.

A further object of the invention is the provision in a conveyer system of a track having elevators at predetermined points whereby certain cars may be automatically lowered to the level of a floor so as to be unloaded and afterward raised to the elevated track and started along said track to perform a return journey to the point from which they originally started.

A further object is the provision in a track system of the character indicated of elevators adapted to be automatically actuated to lower a car by the arrival thereon of a car having certain actuating devices, these actuating devices being preferably set to actuate the particular elevator desired.

A further object of the invention is to provide means upon the elevator whereby the headway of the car may be checked when the car arrives upon the elevator in position to actuate the latter.

A still further object of the invention is the provision of means disposed along the track in advance of an elevator whereby the arrival of a second or third car at a point in advance of the elevator will cause the setting of certain brake devices whereby the headway of the second and third cars may be checked until the elevator has fully descended or fully risen.

A further object of the invention is the provision of a supplementary track carried upon the elevator and adapted to be lowered into position to bridge the gap caused by the lowering of the elevator and permit the passage of cars after the elevator has been lowered.

Another object is the provision in connection with a system of the character described of a car having braking means thereon and the provision of mechanism disposed along the track or way over which the car passes, for actuating said braking mechanism.

Other objects will appear in the course of the following description.

Our invention is illustrated in the accompanying drawings wherein:

Figure 1 is a plan view of a transportation system showing the general character thereof.

Fig. 1ª is a diagrammatic side elevation of the transportation system shown in Fig. 1.

Fig. 2 is a longitudinal vertical section of the car shown in Fig. 4.

Fig. 3 is a side elevation of the construction shown in Fig. 4.

Fig. 4 is an under side plan view of a portion of a car constructed in accordance with our invention.

Fig. 5 is a top plan view of the construction shown in Fig. 4.

Fig. 6 is a vertical sectional view of one of the loading and unloading elevators, particularly of that elevator which is disposed at the lowest point of the gravity system and whereby a car may be raised from the lowest point of the track to the highest point thereof.

Fig. 6ª is a vertical sectional view on the same line as Fig. 6 but showing a continuation of the discharging track shown in Fig.

6 and of the brake system whereby cars are stopped before reaching the elevator.

Fig. 7 is a longitudinal vertical section of one of the elevators to be used along the main section of track, the figure showing the elevator in its raised position.

Fig. 8 is a like view to Fig. 7 but showing the elevator depressed.

Figure 9:
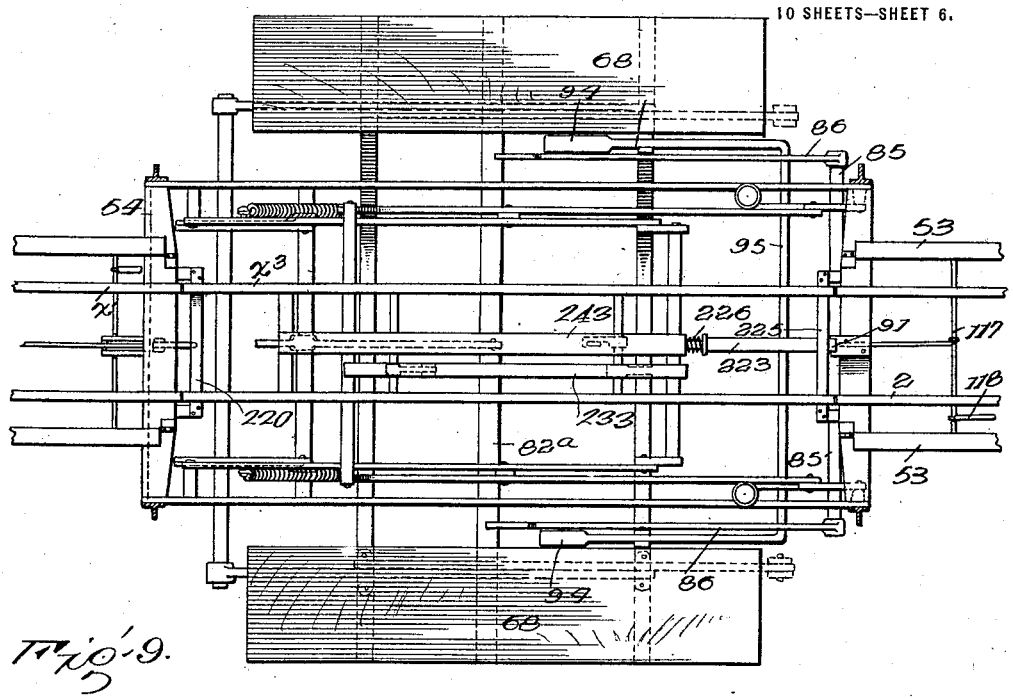

Fig. 9 is a plan view of the construction shown in Figs. 7 and 8.

Figure 10:
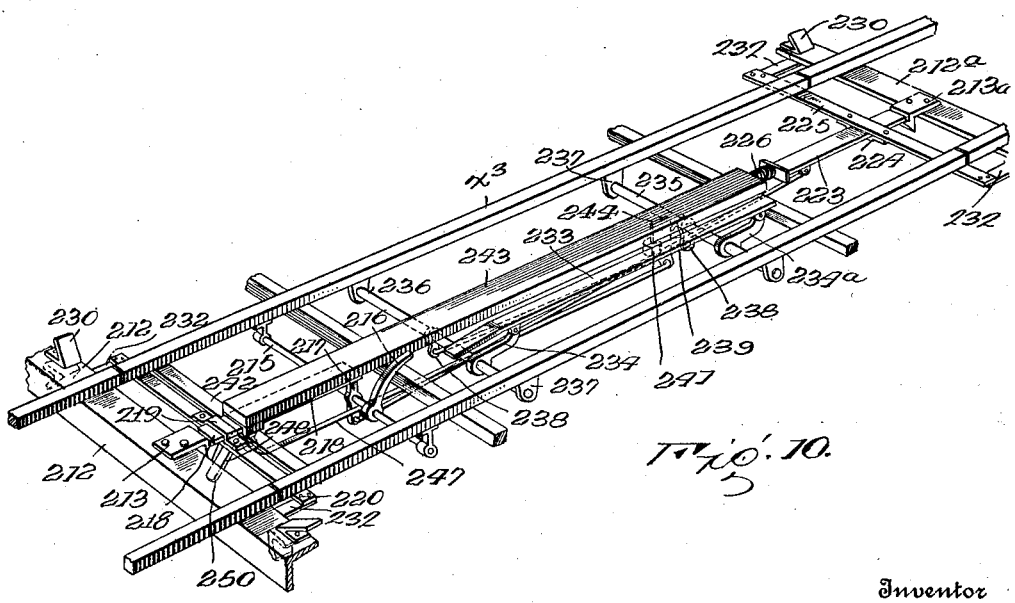

Fig. 10 is a perspective view thereof.

Fig. 11 is an end elevation of the construction shown in Figs. 7 and 8.

Fig. 12 is a fragmentary detail view of the means for raising the brake plate of the construction shown in Figs. 7 and 8 upon a depression of the brake actuating plate.

Fig. 13 is a detail view showing the means for latching the wheels of the car to prevent any steering movement of the wheels, this view also showing the means whereby the wheels may be unlatched.

Fig. 14 is a side elevation of an automatic drop switch which may be used in connection with our transportation system.

Fig. 15 is a plan view thereof.

Fig. 16 is a fragmentary side elevation of a portion of an elevator but showing means operated for actuating it.

Fig. 17 is a side elevation partly in section of a series of brake actuating means.

Fig. 18 is a plan view thereof.

Figs. 19 and 20 are plan views and side views, respectively, of an electric car with my attachments applied thereto.

Fig. 21 is a detail perspective view of a part of the mechanism shown in Figs. 19 and 20.

Corresponding and like parts are referred to in the following description and indicated in all the views of the accompanying drawings by the same reference characters.

Our improved carrier system is particularly designed for the purpose of carrying dishes to and from a kitchen and dining room, though it is not limited to this purpose, and to this end we have provided the endless elevated track which may be supported in any suitable manner, either by posts or standards extending upward from the floor or by hangers depending from the ceiling, this track being formed with an elevated starting point, preferably in the kitchen, from which the track extends into the dining room and continues back into the kitchen, the track being inclined from the starting point to the end of the track.

Fig. 1 illustrates a plan view of the track system and shows four stations within the dining room wherein the cars may be unloaded, though we do not limit ourselves to this number. In this figure, A designates the kitchen and B the dining room while C designates a partition separating the kitchen from the dining room. The highest point of the track is indicated by the character a and the lowest point by the character c.

As illustrated, there is one elevator D disposed in the kitchen which is adapted to receive returning cars and whereby the cars may be elevated from the lowest portion of the track to the portion a and started off upon their journey. Other elevators E, F, G and H are located at any desired points along the track, these elevators being so constructed that upon the arrival of a car thereon which is set to actuate the elevator, the elevator will lower so as to carry the car ownward to a point where it may be unloaded.

Before describing the particular construction of the track, the elevators, the elevator actuating mechanism and the track brake actuating mechanism, it will be best to describe the car which is adapted to run upon the track and to actuate any predetermined elevator. One of these cars is illustrated in Figs. 2, 3, 4 and 5. The car platform which is designated 2 is supported upon a rectangular truck frame 3 of any suitable character. This frame in turn is supported by springs 4 from a rectangular frame 5 which is preferably formed of angle iron and which is disposed about on a level with the car axles. Attached to each end of the frame 5 and projecting inward therefrom are the brackets or like supporting members 6 and pivotally mounted upon these brackets are the front and rear axles 7. The axles are so pivoted that they may be turned in a horizontal plane as indicated in Fig. 5.

Mounted upon the axles 7 are the wheels 8. These wheels are of course freely rotatable upon the axles. The extremities of the axles carry roller bearings 9 which bear against the under face of the frame 5. These rollers play between the under face of the truck frame 5 and the guide plate 10.

The axles 7 are pivoted upon the brackets 6 for the purpose of permitting the axles to turn when rounding a curve so that the car wheels may follow the curve as illustrated in Fig. 5 and also so that the axles may turn to permit the car wheels to properly track when the car passes from a curve onto a straight track. This is necessary where the cars are designed to pass from a starting point around an endless track to return to the came starting point and where, therefore, there are necessarily curves around which the car has to pass. We have provided means for automatically actuating these axles 7 so as to automatically guide the car around curves or onto a straight track. This means is particularly well illustrated in Figs. 3 and 4.

Mounted upon each of the side bars of the frame 5 rearward of the middle of the car is an arm 11 which carries a roller 12 at its forward end. This arm is mounted upon a rock shaft 13 from which projects an upwardly extending arm 14. Pivotally mounted upon the inside of the frame 5 is the rocker 15 to which the arm 14 is connected by means of a link 16. This rocker or lever at its upper end is connected by means of a link 17 to one end of the forward axle 7ª. This link 17 is pivotally connected to the upper end of the rocker 15 while the lower end of the rocker is connected to the rear axle 7ᵇ by means of the link 18.

It will be seen now from Fig. 3 that when the left hand roller 12 is raised, it will draw rearward upon the upper end of the rocker 15. This will draw upon the link 17 and also draw upon the link 18 and will thus cause the left hand ends of the axles 7ª and 7ᵇ to be drawn toward the middle of the car, thus turning the axles in a direction reverse to that shown in Fig. 5. The actuation of the roller 12 on the right hand side of the car on the contrary will act to draw the right hand ends of the axles toward the middle of the car as illustrated in Fig. 5. In this latter case the car axles are so positioned that the car will take a curve toward the right, assuming that the car is going in the direction of the arrow Fig. 5.

For the purpose of actuating these rollers 12 and thus shifting the car axles, we provide bowed third rails designated *b* in Fig. 5. These rails are curved to conform to the curvature of the track and are located on the side toward which the track is to curve or toward which the track is deflected where the track changes from a curve to a straight line. It will be obvious that after the car shown in Fig. 5 has followed the curve of the rails shown therein and comes onto a straight track, the car axles will be shifted back to the position shown in Fig. 4 by the provision of a rail *b* on the outside of the track having inclined ends adapted to engage with the wheel 12 on the left hand side of the car and vice versa. It will be noted that upon a lifting of the roller or wheel 12 on one side of the car the opposite roller or wheel will be depressed.

In order to lock the axles in their turned position, we provide a latching device which is adapted to be unlocked prior to the shifting of the axles and again locked after the axles have been shifted. This device comprises a latch bar 19, one end of which is pivoted to the lower end of the rocker 15 as at 20 (see Fig. 2). This latch bar extends upward and forward at a slight angle and the under side of its extremity is formed with a plurality of notches 21. The free end of the latch bar is adapted to be received in a guide 22 depending from the frame 5 and to shift in this guide which is provided with a transverse pin 23. The extremity of the latch bar 19 inward of the notches 21 is formed with a downwardly projecting finger 24 which as illustrated in Fig. 13 is adapted to engage with the rail or like member designated *b*. When the latch is hooked over the pin 23, it holds the axles rigid.

The operation of this part of the invention is as follows. Just as the car reaches a curve (or just before the car reaches a straight track when the car has been running on a curve) the downwardly extending finger or projection 24 strikes the inclined plane *c* of the upper face of the rail and lifts the latch 19 off the pin 23. Immediately thereafter one or the other of the rollers 12 strikes an inclined rail *b* as previously described which raises the roller 12 and rotates the shaft 13, thus rocking the rocker 15 which draws on the links 17 and 18 thus drawing the corresponding ends of the axles toward each other, the latch 19 latching onto the pin 23 but in another notch. When the car has finished the curve and is about to start on the straight track, latch 19 is again unlatched as before and the opposite roller 12 comes in contact with the inclined third rail *b* which raises it and draws the axles back to their parallel position. It will be seen that both sides of the car are of similar make and that therefore the car is adapted to turn a curve either to the right or left by placing the inclined faced third rail *b* upon the proper side.

In the car described in the hereinbefore mentioned patent to Aaron Horton previously referred to, means are provided whereby brakes may be automatically applied to the wheels of the car under certain circumstances. A like braking mechanism is illustrated in this application but the brake shoes, as they may be termed, are disposed so as to engage the upper faces of the wheels and allow for a movement of the axles when a car is turning a curve.

To this end we mount in bearings 25 upon the frame 5 and extending parallel to each other the brake shafts 26 as shown most plainly in Fig. 5. These brake shafts are disposed about on a level with the uppermost portions of the wheels 8 and carry at their ends the rearwardly and forwardly extending brake shoes 27 which rest upon the upper faces of the wheels 8. At the middle of each shaft 26 there is a centrally projecting arm 28. These arms are disposed at the middle of the car and are yieldably connected at their ends to a brake shoe 29 (see Fig. 2). This brake shoe 29 has upwardly extending terminal portions as illustrated in Fig. 2 and ears inward of the terminal portions.

The specific manner by which the arms 28 are connected to the brake shoe is as follows. Each arm 28 at its inner end is bifurcated as at 30 and pivotally mounted between the bifurcated end of each arm is a block 31. This permits the block to rotate slightly.

The lower end of each block is reduced slightly to fit inside of a coil spring 32. This spring presses up against a collar 33 and presses downwardly against an adjusting nut 34. This nut is threaded on a plunger 35 that passes upwardly through a perforation in block 31. The lower end of each of these plungers 35 is pivoted to the upwardly projecting ears or lugs on the upper face of shoe 29. On the upper end of each of these plungers is an adjusting nut 36 whereby the height of shoe 29 may be adjusted.

Now it will be seen that when upward pressure is brought to bear against the under face of shoe 29, it will tend to rotate both of the shafts 26 applying the brake shoes 27 upon the four wheels. In order to prevent any lateral movement of the brake shoes we preferably provide a link 37 pivoted at its rear end to any suitable support, as for instance the under face of the supporting bracket 6, and at its forward end to the rear end of the brake shoe 29. The springs 32 are relatively strong and do not compress until a pressure greater than necessary to apply the brakes is brought to bear against the shoe 29. The adjusting nuts 36 limit the downward movement of the plungers 35 but allow the plungers to freely slide up through the blocks 31 when the shoe 29 is raised higher than is necessary to apply the brakes. It will of course be noted that the higher the shoe is raised, the stronger will be the stress on the springs 32 and the greater the strength with which the brakes are applied.

As previously stated, the car is provided with means whereby certain car shifting mechanism to be hereafter described is automatically operated. The mechanism for this purpose is illustrated clearly in Figs. 2 to 5 and consists of rollers 38, 38ª and 38ᵇ. These rollers are mounted upon a shaft 39 mounted in suitable bearings, the shaft extending transversely across the car above the brake plate 29. These rollers rotate freely upon the shaft 39 and are for the purpose of pressing downwardly against mechanism whereby track brakes, switches and elevators may be operated as will be more fully explained later. The roller 38ᵇ is disposed adjacent the middle of the shaft 39 and while it may rotate on the shaft it has no transverse motion. This roller is adapted to operate the several brakes on the terminal or kitchen end of track as will more fully appear later. Rollers 38 and 38ª are freely rotatable upon the shaft 39 and are also made to slide laterally on the shaft by means of levers 40 and 40ª. By means of these levers the rollers 38 and 38ª may be shifted in position so as to operate on any desired elevator or like car shifting mechanism. The levers 40 and 40ª are pivotally mounted upon brackets projecting from the frame 5 and at their forward ends they are provided with the knobs 41 whereby they may be operated. The outer ends of the levers are turned upward as at 42 so as to act as index pointers and these pointers move over a graduated plate 43 mounted upon the forward end of the car as illustrated in Fig. 2.

Now when it is desired to operate a certain elevator or like car shifting device, one of the pointers, as for instance the pointer on lever 40ª, is moved along the numbered plate 43 to the number of that elevator. This shifts the roller 38ª in a position to operate that elevator, the roller 38 being moved out of line of any elevator actuating device.

The ends of shaft 39 are carried in the lower ends of plungers 44 and 45. These plungers pass upwardly each through a guide 46 carried upon the frame 5 and on the upper ends of these plungers are fitted collars 47 held in their places by coil springs 48.

As before stated, the car platform 2 is mounted upon springs 4. To this end there are disposed at the four corners of the car platform the downwardly extending posts 49 which pass loosely through the truck frame 5. Fitted around the upper ends of these posts are the springs 4 while disposed around the lower ends of the posts and disposed between the collar 50 and the horizontal flange of the angle frame 5 are the springs 51. These springs work in opposition to each other so that the car body is balanced between the upper and lower springs. These springs are compressed sufficiently so that when the car is loaded to its full capacity the lower springs will still exert a slight pressure. By this arrangement it will be seen that the slightest load will be felt by the springs.

As before stated, the plungers 45 pass upwardly through guides 46. The car platform 2 as illustrated in Fig. 3 bears upon these plungers. Thus when a heavier load is placed upon the car the rollers 38, 38ª and 38ᵇ will be forced down more strongly than when a lighter load is upon the car. This is for the reason that the brakes must be applied more strongly with heavy loads than with light loads in order to cause the car to stop at the same place as will be later described.

As illustrated in Fig. 1ª, the track structure is supported by means of vertical standards or members designated generally 52. It will be understood that these vertical members may be extended upward either to the level of the track or vertically beyond the level of the track for certain purposes to be hereafter described but that all the standards without regard to their length are designated 52. These standards are connected by longitudinal members designated 53. The vertical members and the longitudinal members are preferably formed of angle iron and may be of any suitable construction. While we have illustrated the track as being supported upon vertical members which extend upward from the floor, we wish it understood that we are not limited to these means for supporting the track structure as it is within the purview of our invention that the track may be supported in any suitable manner either from the ceiling or from brackets. As illustrated, the longitudinal members 53 are connected at intervals by cross bars 54 or in any other suitable manner so as to secure the proper strength for the elevated structure. The elevated structure is designed to be of sufficient height to permit the passage of waiters or other persons beneath the same.

As before stated, this elevated structure starts from a relatively high point in the kitchen, extends into the dining room or other place where the dishes or articles carried by the cars are to be unloaded, extends around in a curve or loop through the dining room, then back into the kitchen to a discharge point, this discharge point being sufficiently lower than the initial starting point to cause the cars to travel by gravity from the initial starting point to the discharge point. At the discharge point the cars are unloaded and reloaded and then lifted to the initial starting point by means of an elevator.

In Fig. 6 we show that section of a track including the elevator D, the discharge point $c$ and the initial starting point $a$. Before referring to the brake mechanism whereby the cars are checked previous to their passage upon the elevator, we will describe the elevator structure D.

X designates the elevator rails on which the car runs after it leaves the rails $x^1$ which form the discharge end of the track at $c$. These rails X when in their lowered position as shown in Fig. 6 match with the rails $x^1$ of the return track $c$, and when in their upper position match with the rails of the outgoing track $x^2$. These rails X are rigidly fastened to cross bars $53^a$ and $54^a$. The cross bar $54^a$ is carried upon oppositely disposed, downwardly extending links 55. These links 55 are pivotally connected to the cross bar $54^a$ at each end. The lower ends of the links are pivotally connected to levers 56 which in turn are pivotally connected to studs 57 carried by outwardly projecting brackets 58 mounted upon the upper end of the rear standards 52. The cross bar $53^a$ has each end turned downward as at 59 and these downwardly turned ends are connected to levers 60, which levers cross and are pivoted to the levers 56 at the point 61. The levers 60 extend forward and then upward above the track X and at their upper ends are pivotally connected to bell crank levers 62. The levers 56 and 60 are the levers that carry the rails X and keep them nearly in horizontal position when the rails are lifted so as to prevent the car from running off the rails. The rearwardly projecting upper arm 63 of the bell crank lever 62 is pivotally connected at its extremity to a cushioning cylinder 64. Within this cushioning cylinder there is disposed a piston 65 and from this piston extends a piston rod 66 which is connected to a bracket 67. It will be understood that there are two of these cushioning cylinders, one on each side, two brackets and two of the bell crank levers 62.

This cushioning device, comprising the parts 64, 65 and 66, is a double acting cushion and makes a down and up stroke for each full motion of the elevator, either from its lowered position to its raised position, or from its raised position to its lowered position. This form of cushion is fully illustrated and described in the application of Aaron Horton for cushioning devices, filed on the 13th day of October, 1911, Serial No. 654,525. The operation of this cushion will be described a little later.

The elevator is supported normally in the position shown in Fig. 6, and may be raised either manually by the means shown in Fig. 6, or by power as shown in Fig. 16. For this purpose, we provide platforms designated 68 disposed one on each side of the track structure and adjacent to the floor of the kitchen. This floor is designated 69 and is intended to be raised somewhat above the regular floor level. Each platform 68 is supported by means of crossed levers 70 and 71. The lever 70 is pivoted at one end to a bracket 72 projecting from the elevator structure while the lever 71 is illustrated as having a slot at its extremity and being pivoted in an ear 73 which projects downward from the floor 69, the floor being slotted to permit the operation of the levers 70 and 71.

The upper end of each lever 71 is pivoted to an ear 74 carried on the lower side of the platform 68 while the upper end of the lever 70 is slotted and passing through this slot is a pin 75 which also passes through ears 76 projecting downward from the platform 68. Also mounted upon the platform are unlatching devices which will be later described.

Projecting forward from the elevator structure and above the platform 68 are the brackets 77 supporting a shaft 78 on which is mounted at its middle a two-armed bell crank lever. This lever is formed with two radially projecting arms 79 and 80. The arm 80 is somewhat longer than the arm 79 and is connected by a vertical link 82 to a cross bar $82^a$ which extends beneath the platforms 68. The upwardly and rearwardly projecting arm 79 is connected by means of a link 83 to an arm 84 mounted upon a rock shaft 85 from which rock shaft project the actuating levers 86. It will be seen that a depression of the platform 68 and a lifting up of the lever 86 will act to rotate the bell crank in the direction of the arrow Fig. 6.

The lower ends of the arms or levers 81 are connected to retractile spring $81^a$ as will be later described.

Also mounted upon the shaft 78 are the oppositely disposed, upwardly and rearwardly projecting arms 87 which at their upper ends are connected by links $82^b$, each to one of the levers 56 as illustrated in Fig. 6. It will thus be seen that upon a downward movement of the platform 68 and an upward movement of the handle lever 86, the shaft 78 will be so rotated as to cause the arms 87 and the links $82^b$ to move nearly into a straight line, thus raising the links 56 to the dotted line position shown in Fig. 6 and raising the track rails $x$ to the level of the track rails $x^2$. This upward movement of the elevator is cushioned by the cushion 64 as will be later stated.

In order to hold the elevator in its lowered position and the track rails X in line with the track rails $x^1$, we provide supporting brackets 88 which are mounted upon the standards 52 or upon the cross braces of the standards, these brackets being adapted to support a cross bar 89 which is connected to the under face of rails $x$.

Pivotally mounted upon these brackets 88 is a bell crank lever 90. This bell crank lever has an upwardly projecting arm and a forwardly projecting arm. The upwardly projecting arm is formed with a latching head or detent 91 while the forwardly projecting arm is connected by a link 92 to a lever 93. This lever is disposed midway between the vertical supporting members 52 and projects rearward.

Pivotally mounted upon each platform 68 is a treadle 94. The forward ends of these treadles are connected by means of a cross bar 95 which extends beneath the rear or free end of the lever 93 so that a depression of either one of the treadles 94 will cause the rear end of the lever 93 to lift, thus drawing down upon the link 92, rotating the bell crank lever 90 and withdrawing the latch from the coacting member on the track structure to permit the lifting of the elevator by the operator.

Mounted on the cross bar 89 and guided in a suitable guide formed therein and disposed midway of the track rails $x$ is a latching bolt 96. The rear end of this bolt is supported in a suitable guide on the cross bar $54^a$ to which the links 55 are pivotally connected. The locking bolt has upon it a collar 98 and disposed between the cross bar $54^a$ and this collar is a compression spring 99 which acts to project the bolt.

Connected to the bolt is a push rod 100 which extends rearward and is connected to the lower end of a pivoted detent 101. This detent at its upper end is pivotally connected to a brake bar 102. One end of this brake bar is free for vertical movement but the rear end thereof is pivotally supported upon a cross bar 103. This bar 102 is adapted to engage with the brake shoe 29 on the car so as to set the car brakes. Disposed between the brake bar 102 and one of the rails $x$ and adapted to be engaged by the wheel $38^b$ on the car is a plate 104 having an inclined entrance end 105.

Extending transversely across the track and rotatably mounted in ears depending therefrom are the rock shafts 106 and 107. Mounted upon the rock shaft 106 is an upwardly and forwardly extending arm 108 pivotally connected to the under side of the plate 104. Mounted upon the rock shaft 107 is a like arm 109 and a downwardly extending arm $109^a$ which is connected to the downwardly extending arm $108^a$ by means of the link 110. Thus these arms 109 and 108 will move together and the ends of the plate 104 will move equally. Projecting from the shaft 107 is the rearwardly projecting tooth 111 adapted to engage in a notch in the detent 101 or under a projecting portion of the detent below the notch. A spring 112 is attached to the downwardly extending arm $109^a$ and to the links 55. This spring acts to resist the rearward movement of the link 110 and the rotation of the shafts 106 and 107.

For the purpose of locking the elevator in its uppermost position, we attach to the cross bar 113 which supports the rails $x^2$ the keeper 114 having a beveled lower face which is adapted to contact with the extremity of the bolt 96 and force inward this bolt until it has passed the upper end of the keeper when the bolt will be projected out into engagement with the keeper as shown in dotted lines in Fig. 6 and support the parts in their upraised position.

The cross bar 113 is perforated just above the face of the keeper and passing through this perforation is a push pin 115 whose extremity is connected to an arm 116 mounted upon a rock shaft 117 which rock shaft carries the upwardly and forwardly curved arm 118 which is located adjacent to one of the rails $x^2$.

The whole purpose of the apparatus just described is to provide for automatically checking and stopping the car when it arrives upon the elevator and holding the car from any movement upon the rails X until the elevator has been raised to its highest position whereupon the brakes will be automatically removed from action and the car allowed to pass out upon the rails $x^2$.

The operation of this mechanism is as follows. When the car runs onto the elevator, the roller $38^b$ presses down on bar or plate 104 rotating shaft 107 which through its engagement with the detent 101 raises bar 102 pressing it up against the brake shoe 29 under the car and this applies the brakes 27 thus holding the car upon the elevator. When the elevator is raised by means of the manually or power actuated mechanism heretofore referred to, the end of latch 96 contacts with the beveled face of the keeper 114 and thus the latch bolt 96 is shoved back. This also shoves back on the link 100 which shifts the detent 101 rearward. Inasmuch as the rearward movement of the detent unlocks the detent from its engagement with the tooth 111, the forward end of the brake bar 102 is allowed to drop thus freeing the car and permitting it to start. As the latch bolt 96 passes over the keeper 114 it will again latch so as to hold the elevator in its raised position. When the car runs off the elevator onto the rails $x^2$, one wheel comes in contact with and depresses the lever 118. This action through the rock shaft 117 and the push rod 115, pushes the locking bolt 96 off the keeper 114 and permits the elevator to return to its lowest position, the lowering movement of the elevator being cushioned by the action of the cushion 64.

Means must be provided for preventing an oncoming car from running into the space within which the elevator moves when the elevator is in its raised position. For this purpose we provide the brake mechanism illustrated at the left hand end of Fig. 6 and in Fig. $6^a$. This mechanism includes a brake bar 119 mounted in exactly the same manner as the brake bar 102 of the elevator section. The rear end of this bar 119 is pivoted while its free end carries a downwardly extending pivoted detent 120 notched upon its forward edge. The brake bar is located centrally between the tread rails and is adapted to be engaged by the brake shoe 29 which is suspended centrally under the car and which throws on the brakes on the car when the car arrives thereon. The means for raising this brake plate 119 so as to actuate the brakes on the car is as follows.

Near the free end of the brake bar or plate 119 is the downwardly extending pivoted detent 120 whose notch engages with the rearwardly extending arm of a bell crank lever 126 which is mounted on a transverse shaft 124. The downwardly extending arm of the bell crank lever 126 is connected by a link 125 to a downwardly extending arm fastened centrally on a shaft $124^a$. This link 125 causes the shafts 124 and $124^a$ to rotate coincidentally.

Fastened upon the shafts 124 and $124^a$ to one side of the middle of each shaft are the bent levers 122 and 123. The forward and upper ends of these levers support a brake actuating bar or plate 121 which is pivoted to them. The levers 122 and 123 are fastened to and rotate with shafts 124 and $124^a$ but are adjustable upon the shafts so as to gage the height of the brake actuating bar 121.

When a car arrives upon this section, the roller $38^b$ of the car will press down on the brake actuating bar or plate 121 rotating the bell crank lever 126. This will not, however, raise the detent 120 and the plate 119 as the detent is out of engagement with the extremity of the bell crank lever 126 and thus the car passes onto the elevator. As this first car passes onto the elevator, one of its tread wheels comes in contact with a lever 138 pivotally mounted in any suitable manner below the rails pressing the upper end of this lever forward and downward. The lower extremity of this lever engages an upwardly projecting arm $135^a$ mounted on a shaft 135. Also mounted on the shaft 135 is an arm 136 which extends forward and is disposed beneath a rod 131 which extends rearward and is pivotally connected to the lower end of the detent 120. This lifting of rod 131 permits the forward end of this rod to escape over a lug $128^a$ on the downwardly extending arm of a bell crank lever 128 mounted upon the cross bar 127, the rod 131 moving forward under the impulse of a spring 132 and thereby drawing the detent 120 into engagement with the bell crank lever 126.

When the next following car arrives on this section and presses downward on the brake actuating bar 121 by means of the roller $38^b$, it will rotate the bell crank lever 126 and raise the detent 120, thus raising the brake plate or bar 119 and pressing it up against the brake shoe under the car, thus applying the brakes and stopping the car at this point so that it cannot run against the car or on the elevator. Now when the elevator has been raised by manual motive power and again lowered, it presses downward on the forwardly extending arm of the lever 128 as shown in Fig. 6 which pushes rearward on the rod 131 (which rod 131 has dropped into position again after the elevator has been raised) and disengages the detent 120 from the bell crank lever 126 allowing the brake plate 119 to lower. This releases the brake and the car starts by gravity onto the elevator.

In order to prevent a following car from running upon the section C when there is a car resting upon this section waiting to pass onto the elevator, we provide the automatic brake device shown in Fig. $6^a$ and indicated by the letter $C^1$. This braking mechanism is almost exactly the same as the braking mechanism C and in operation differs from the more simple brake mechanism of section C in that it stops every car for a few seconds whether there is another car ahead or not, and if there is no car ahead it automatically allows the car to start again.

This is for the purpose of bringing every car to a uniform speed before reaching the elevator, whether they have been running fast or slow before reaching the section $c^1$.

To this end we provide in advance of the actuating members 121 and the brake member 119 a brake plate 140 which is pivotally mounted at its rear end as previously described for the plate 119 and which is adapted to engage with the brake shoe of the car when it is raised. Mounted adjacent to the plate 140 is the actuating plate 141 which has a beveled entrance end 142 and which is pivotally connected to arms 143 and 144 adjustably mounted upon shafts 143$^b$ and 144$^b$ respectively. The shaft 143$^b$ has mounted upon it a bell crank lever 143$^a$ having a rearwardly projecting arm 145 with a laterally disposed tooth engageable with a detent 146 pivotally mounted upon the brake member 140. This detent 146 depends from the brake member and is notched upon its rear edge as at 147. The depending end of the bell crank 143$^a$ is connected by means of the rod 148 with the depending arm 144$^a$ which is mounted upon the shaft 144$^b$ so that the arms 143 and 144 will move together, keeping the brake actuating bar 141 horizontal.

Pivotally mounted upon the brake member 140 opposite the detent 146 is the depending latch 149 which may be engaged by the rearwardly extending arm of the bell-crank lever 143$^a$ which at its middle is enlarged and formed with a slot 150. A rod 151$^a$ carries a piston 152$^x$ which moves within the cylinder 153 having therein a spring 154. This rod at one end is connected to the lower end of the depending arm 144$^a$ and at its other end is connected to the latch 149 by engaging in the slot 150 thereof. The lower end of the latch 149 has pivoted thereto a rack bar 155 which extends forward and whose teeth engage with a pinion 156 mounted upon the shaft carrying a gear wheel 157. This gear wheel engages with a pinion 158 upon the shaft of which is mounted a rotating fan 159. This fan forms a retarding device acting to retard the rearward movement of the rack 155. A spring 159$^a$ is connected at one end to the supports for the shaft 156 and at its other end is connected to the depending arm of the bell crank 143$^a$ so as to tend to draw this depending arm forward and force the plate 141 upward.

The operation of this device is as follows. When the first car arrives upon this section the roller 38$^b$ located beneath the car comes in contact with the brake actuating member 141 pressing it down. This action rotates the arms 143 and 144 and the bell crank lever 143$^a$ lifting the rearward arm 145 of said lever and the latch 149 that is engaged with it. This raises the brake bar 140 which, of course, applies the brakes to the car wheels as before described. Now at the same time by the rotation of shaft 144$^b$ the downwardly extending arm 144$^a$ has been drawn rearward, exerting a rearward pull on the rod 151$^a$ and compresses the spring 154 within the cylinder 153. The rearward movement of the rod 151$^a$ tends to release the latch 149 from the arm 145 but also draws the rack 155 so as to actuate the described gearing and the fan 159, the operation of which delays the unlatching so that the brakes will not be instantly released and the car will, consequently, be retarded. After the latch is disengaged, the brakes release and the car proceeds. When there is another car ahead, however, this other car has shifted the rod 146$^a$ rearward latching the detent 146 with the bell crank 145 so that the plate 140 will be prevented from lowering and, therefore, the car is held at this point until the car ahead moves on, allowing push rod 146$^a$ to move forward, releasing the detent 146, which, of course, allows the brake plate 140 to lower, whereupon the car is free to start.

The rod 146$^a$ connects the detent 146 with the depending arm of the lever 122 so that movement of the lever is transmitted to the detent.

After the car has run upon the elevator section, it is unloaded of its empty dishes and filled dishes are placed upon the car. It is then in condition to be elevated to a level with the rails $x^2$ so as to permit the car to pass off and make its rounds upon the elevated track, the members 38 and 38$^a$ being so set as to actuate any particular elevator to automatically lower the car to a level. The raising of the car is accomplished by the operator standing upon the platform 68, depressing the locking lever 94 with his foot and at the same time raising up upon the lever 86. This causes the elevator to lift to the position shown in dotted lines in Fig. 6 and brings the car to the level of the track $x^2$, and permits it to pass off to the elevator E. This elevator is illustrated in Figs. 7 and 8; Fig. 7 showing the elevator E in its normal position ready to receive a car, and Fig. 8 showing the elevator E depressed in position to permit the unloading of the car and at the same time permitting the passage of a car upon the elevated tracks.

The elevator above referred to is practically the same as that before described except in certain details of construction. The rails $x$ are separated from each other, and disposed between the rails $x$ are the elevator rails $x^3$. These rails $x^3$ when in their upper position form a portion of the track $x$. These rails are supported by cross bars 160 and 161. To the ends of the cross bar 161 are connected the downwardly depending links 162, the lower ends of which are pivotally connected to the oppositely disposed levers 163. The opposite ends of these levers are pivotally mounted on studs 164 mounted on brackets projecting from the supporting framework of the elevator.

The cross bar 160 has downwardly turned ends 165 which are pivotally connected to levers 166. These levers 166 cross the levers 163 at 167 and are pivoted thereto at this point. The opposite ends of these levers 166 are pivoted to swinging angular levers 168 each of which is pivoted at the intersection of its arms as at 169 to the supporting frame of the elevator. The upper ends of each of these levers is pivotally connected to the lower end of a double acting cushion cylinder 170 of the same character as that heretofore described. Within this cylinder is a piston as previously described, this piston being connected to an upwardly extending piston rod 171 attached to a longitudinal bar 172 of the supporting frame. The levers 168 hang in a normal position when the elevator is either entirely raised or entirely lowered. It will be noted that the position of these levers 168 is the same in both Fig. 7 and Fig. 8.

Pivotally connected to each of the levers 163 at the point 173 is a depending link 174 which in turn is pivoted at its lower end to a lever 175 which is rotatably mounted upon a transverse shaft 176 supported in brackets 177.

Mounted opposite to the shaft 176 is a shaft 178 which carries the upwardly projecting arm 179 rigid with the shaft and with the oppositely disposed handles 180 which are located at the ends of the shaft. The arm 179 is formed with a plurality of perforations 181 engaged by a link 182. This arm 179 is located in the middle of the shaft 178.

Located at the middle of the shaft 176 is an upwardly projecting arm 183 to which the link 182 is connected. Also disposed at the middle of the shaft 176 is the outwardly projecting arm 184 which is connected by a link 185 to a cross bar 186 which with a cross bar 187 supports the platforms 188 and 188$^a$. By reference to Fig. 9 it will be seen that these platforms are disposed one on each side of the framework of the elevator in position to be stepped on by the operator. Pivotally connected to these cross bars 186 and 187 are the oppositely disposed pairs of crossed levers 189 and 190 which are pivoted at their other ends to brackets 191 and 192. These levers are pivoted together intermediate their ends as at 193.

It will be seen now that when an operator steps upon either of the treadles or platforms 188 or 188$^a$ and grasps either of the handles 180 and draws up thereon, the upward pull upon the handle 180 and the downward pressure upon the corresponding platform or treadle 188 will cause a rotation of the shaft 176, and the lever 175 will move from the position shown in Fig. 8 to that shown in Fig. 7, pushing upward on the lever 163 and raising the tracks $x^3$ to the position shown in Fig. 7, that is, to a level with the tracks $x$. When a loaded car is run upon the tracks $x^3$, the weight of the car and its contents will depress the elevator into the position shown in Fig. 8 so that the contents of the car may be removed. After removal, the car is raised again and allowed to run off, the elevator then taking the position shown in Fig. 7.

In order that when the elevator is lowered as shown in Fig. 8, the space between the rails $x$—$x$ may be bridged so as to permit the passage of a car along the tracks $x$, we provide supplementary tracks $x^4$. These tracks are supported by means of cross bars 194 and 195. The cross bar 195 is pivotally connected to oppositely disposed levers 196 which are angular and are connected at their outer ends at at 197 to upwardly extending links 198 pivoted to the vertical supports of the frame of the elevator. The cross bar 194 has depending from its ends the pivoted links 199 which in turn are pivoted at their lower ends to angular levers 200, these levers being pivoted at their outer ends as at 201 to the vertical members of the elevator frame. The levers 196 and 200 are pivoted to each other intermediate their ends as at 202 and the levers 200 are connected to the levers 163 by means of links 203.

Under these circumstances it will be seen that when the elevator is raised as shown in Fig. 7, the upward movement of the levers 163 will cause an upward movement of the links 203, lifting the levers 200 and elevating the track $x^4$ to a sufficient distance to permit the passage of a car beneath the same. Upon a depression of the elevator as shown in Fig. 8, the downward movement of the levers 163 will draw downward on the links 203 which in turn will draw downward on the levers 200 which will move the track rails $x^4$ to a position in line with the tracks $x$—$x$.

For holding the elevator locked in its depressed position shown in Fig. 8, we provide the latch 204 which is adapted to engage with locking bolts which will be later described. In connection with the latch 204 there is also provided a supporting bracket 205 upon which the weight of the track and car may be supported when the elevator is lowered. It will be noted that the latch 204 has a beveled upper face 206. The latch 204 is mounted upon a shaft 207 and extending from this shaft are the oppositely disposed arms 208 which are disposed at right angles to the latch 204, these arms being each connected by means of a rod 209 which upwardly projects from actuating members 210.

Each actuating member 210 is disposed in the path of a treadle 211, there being one treadle mounted upon each of the platforms 188. Each treadle is pivoted at its middle. When the elevator is lowered as shown in Fig. 8, the platforms of the treadles 211 each bringing the ends of the members 210. When, therefore, it is desired to raise the elevator, the operator as before stated steps upon the corresponding platform 188, grasps the corresponding lever 180 and depresses the inner end of the corresponding treadle 211. The outer end of the treadle engaging the arm 210 is thereby rocked and through the connection 209 rocks the shaft 207 and shifts the latch 204 outward, thus releasing the elevator and permitting its upward movement.

Mounted upon a cross bar 212 connecting the rails $x$ at the entrance side of the elevator as illustrated in Fig. 7 is a supporting catch 213 having a depending lip 214 formed with a beveled outer face. Mounted upon the cross bar $212^a$ of the exit rails $x$ is the catch $213^a$ also formed with a depending lip having a beveled under face. These catches 213 and $213^a$ are for supporting the rails of the elevator in their lifted position and engage with said rails in the manner shown in Fig. 7.

It is, of course, necessary to check a car after it has arrived upon the rails $x^3$ and hold it upon these rails as the elevator is lowered, and it is likewise necessary to release the car and permit its forward passage when the elevator has been raised from a lowered to an elevated position. For this purpose we provide practically the same devices as have been heretofore described for automatically applying a brake upon the arrival of a car upon the rails $x^3$, holding said brake applied and releasing the brake after the elevator has again moved upward in position to discharge the car. It is also necessary to provide mechanism whereby the elevator shall be locked in its raised position but automatically unlocked by a car having a properly set elevator actuating device thereon. The mechanism to this end is as follows.

Mounted upon the under side of the rails $x^3$ and extending transversely across these rails is a rock shaft 215 upon which is mounted at one side of the middle line of the track the upwardly and forwardly rounded arm 216 which is disposed in the path of one of the elevator actuating rollers 38 or $38^a$ when either one of these rollers is set for this particular elevator.

The shaft 215 has mounted upon it the vertically disposed arms 217 (see Fig. 7). The upwardly extending arm is connected to a bolt 218 which passes through a guide 219 carried upon a cross bar 220 and the extremity of which is adapted to engage with the corresponding catch 213. See Fig. 10. The depending arm 217 is connected by means of a link rod 221 to a lug 222 depending from a latching bolt 223 which passes through a guide 224 on the under side of the cross bar 225 corresponding to the cross bar 220. The extremity of this bolt 223 engages with the catch $213^a$ when the elevator is in its raised position. The bolt 223 is forced outward by a spring 226 which surrounds the bolt and which bears against a swiveled head 227 carried upon depending legs mounted upon the cross bar 161. This spring 226 therefore will act to project both of the bolts 218 and 223 and consequently raise the arm 216 to the position shown in Fig. 7.

Assuming that the parts are in the position shown in Fig. 7, the wheel or actuating member 38 or $38^a$ of the car if properly set will contact with the arm 216 and depress this arm thereby rocking the arms 217 and retracting the bolts 218 and 223, whereupon the weight of the car will cause the rails $x^3$ to descend. Upon an upward movement of the elevator, the inclined faces of the catches 213 and $213^a$ will force the bolts inward until the bolts have passed the catches. Upon a downward movement of the elevator as illustrated in Fig. 8, the bolt 223 will be forced inward by contact with the beveled face of the latch 206 and will catch beneath this latch.

The rails $x^4$ are provided at their ends with the transversely extending bars 228 attached to the under side of the rails from the ends of which project the outwardly extending guiding lugs or tongues 229. When these rails $x^4$ are depressed these guiding tongues will come in contact with the guides 230 which are attached to the upper faces of the cross bars 212 and $212^a$. As illustrated in Figs. 9 and 10 these guides are upwardly and outwardly flared and when the rails $x^4$ descend the tongues 229 will be guided by these guides 230 so as to bring the rails $x^4$ into proper alinement with the rails $x$. The under faces of the cross bars 212 and $212^a$ are also provided with the guides 231 which are downwardly and outwardly beveled or flared and the cross bars 220 and 225 of the rails $x^3$ are also provided with the forwardly projecting arms or tongues 232 which are adapted to engage with these guides 231 when the rails $x^3$ are raised thus guiding the rails $x^3$ into alinement with the rails $x$.

Disposed in line with the arm 216 is the brake actuating plate 233. This is mounted on the arms 234 and $234^a$ which are attached respectively to the shafts 236 and 235 which are supported in bearings 237 depending from the rails $x^3$. These shafts 235 and 236 are each provided with depending arms 238 connected to each other by means of a link 239 so that the arms 234 and $234^a$ move together to raise or lower the plate 233. The shaft 235 has a rearwardly projecting arm 240 formed with a laterally projecting lug 241 as illustrated in Figs. 7 and 8.

Pivotally mounted upon the cross bar 242 which extends beneath the rails $x^3$ at the entrance end thereof is a brake plate 243. This at its forward or free end is provided with the depending pivoted detent member 244 notched on one side as at 245 to engage over the lug 241. This detent 244 is drawn rearward by means of a spring 246 and the lower end of this detent is connected by means of a rod 247 to an angular trip lever 248 mounted upon a shaft 249, this trip lever being provided with the rearwardly and downwardly projecting arm 250.

Mounted beneath the member 213 is a depending curved tripping member 251 which can move rearward but can not move forward. This tripping member 251 is disposed in the path of the tripping lever 248. As the rails $x^3$ move downward the tripping member 251 will yield to permit the passing of the tripping arm 250. Upon an upward movement of the rails $x^3$ however the tripping member 251 will engage the arm 250, depressing the same, shifting the link 247 forward, shifting the free end of the detent 244 forward and releasing it from its engagement with the lug 241.

It will be apparent from the above that when a car arrives upon the proper elevator, if its elevator actuating wheel 38 or $38^a$ is in proper position, the actuating wheel will engage first the unlatching member 216 as previously described and will then engage and depress the brake actuating plate 233. The depression of the plate 233 will cause the arm 240 to lift, whereupon the lug 241 engaging with the notched end of the detent will lift the detent 244 and with it the brake plate 243 which will contact with the brake shoe 29 of the car and apply the brakes on the car. These brakes will be held applied while the elevator is lowering and until the rails $x^3$ have been raised again to the position shown in Fig. 7. As these rails $x^3$ rise the projecting arm 250 will come in contact with the tripping member 251 and consequently the detent 244 will be swung forward clearing the lug 241 and permitting the brake plate 243 to fall thus releasing the car. The car will now run off the track and as soon as it has done so the spring $246^a$ will cause the bell crank levers 234 and $234^a$ to return to their normal position and the lug 241 to again engage the notch of the detent 244.

As previously pointed out, the cushion 170 is a double acting cushion of the kind heretofore described and upon a full downward movement of the rails $x^3$ from the position shown in Fig. 7 to that shown in Fig. 8, or a full upward movement back to the position shown in Fig. 7, the lower ends of the bell crank levers 168 will be shifted from the position shown in Fig. 7, and back again. It will thus be seen that the piston of the cylinder 170 will be fully retracted and then again moved inward into the cylinder upon either a full downward movement or a full upward movement of the elevator.

In order to provide for counterbalancing the weight of the elevator and the greater proportion of the weight of the car so as to reduce the strength necessary to raise the elevator, we provide the balancing springs 252 and 253 as illustrated in Figs. 7 and 8, and also in Fig. 11. The lower end of each balancing spring 252 is attached to the lower end of the lever 175 while the upper end of the balancing spring 253 is attached to the lever 175 above the pivot 176 thereof.

Adjustably attached to each bracket 177 is a spring adjusting plate 254 having the form illustrated in Fig. 8 with two oppositely projecting arms in offset relation to each other and disposed tangentially with relation to the shaft 176. The outer end of each arm is formed with a swiveled block 255 and through these blocks pass bolts 256 which engage with their respective springs 252 and 253, these bolts being adjustable through the swiveled blocks by means of nuts 257. The adjusting plate 254 is rigidly fastened to its respective bracket 177 but is adjustable on the bracket in a circular direction so that the springs can be adjusted to exert an equal lifting capacity to the elevator for its full stroke. This adjustment may be secured in any suitable manner.

Ordinarily the weight of the operator is sufficient to lift the elevator from its lowered to its raised position but in case the weight to be lifted is too great, then the operator may use the corresponding emergency lever 86 for this purpose. The operation of the elevator shown in Figs. 7 and 8 is plain from what has gone before and needs no separate description. The elevator at F, G, and H are all of precisely the same construction as the elevator at E which is illustrated in Figs. 7 and 8. While we have only shown four elevators—E, F, G, and H—it is obvious that any number of elevators may be used and that by adjusting the actuating rollers 38 and $38^a$ any one of these elevators may be automatically lowered upon the arrival of a car thereon. After a car has been unloaded and again elevated to the level of the main track the car will pass onward by gravity from the main dining room or from any place where the car is unloaded to the kitchen. In the kitchen it is again loaded and raised by the mechanism shown in Fig. 6 to the height of the main track rails.

In Figs. 14 and 15 we show a modified mechanism whereby cars may be lowered from the level of the main track to a position where they may be unloaded, this drop switch and the unloading section used in connection therewith being adapted to be substituted for the elevating mechanism shown in Figs. 7 and 8. In this construction $x^5$ designate the rails of the main track which are supported upon a supporting framework comprising standards and cross bars as heretofore described. The rails $x^6$ are the switch rails. These rails are supported upon cross bars 258 and 259. The cross bars 259 have depending links 260 to the lower ends of which are pivoted the opposed levers 261 which extend downward and forward and are pivoted to the lower ends of links 262, which in turn are pivoted to the main supporting frame at 263. The cross bar 258 is pivoted at its ends to the forward extremities of levers 264. These levers are angular in form and at their rear ends are pivoted as at 265 upon studs projecting outward from the standards of the main frame. The levers 261 and 264 are pivoted to each other as at 266 so that the levers will move in unison to carry the switch up or down and support the switch rails in a horizontal position whether they are up or down.

The switch rails are supported in a position in alinement with the rails $x^5$ by means of springs and levers very much as described for our former construction. In other words, the ends of the cross bar 258 are provided with depending links 267, these links at their lower ends being pivoted each to a lever 268 which is pivoted intermediate its ends upon a bracket 269 depending from one of the longitudinal members 270 of the main frame. The rear ends of each of these levers 268 is connected to a cushioning cylinder 271 of the type heretofore described, this cushioning cylinder however being a single acting cylinder. A piston is disposed within each cylinder from which extends upward a piston rod 272 which is connected at its upper end to the member 270ª of the main frame.

It will be obvious now that when the track rails $x^6$ are depressed, the rear ends of the levers 268 will be shifted upward and the piston rod will cushion the upward movement of the corresponding cylinder 271 and resist the downward movement of the elevator. The forward ends of the levers 268 are held in their raised position and the track rails $x^6$ therefore held in alinement with the track rails $x^5$ by means of the springs 273. Each spring is a coil spring attached at its forward end to the corresponding lever 268 and at its rear end attached to an eye-bolt 274 which passes through a swiveled head 275 mounted upon an adjustable arm 276. This arm is pivoted upon the bracket 269 and is formed at opposite portions with the slots 277 through which set screws pass so that the arm 276 may be adjusted rotatively. The springs 273 while resisting the downward movement of the drop switch will not prevent this downward movement but simply act to balance the switch.

As in the elevator construction previously described, we have provided means for locking the elevator in its raised position and means for automatically unlocking the elevator upon the arrival of a car thereon so that the elevator might descend under the weight of the car, so in this automatic drop switch we provide locking devices for holding the drop switch raised and means for unlocking these locking devices when a car whose lock actuating member has been properly disposed arrives upon the switch.

To this end we provide the longitudinally extending plate 278 which is disposed in position to be engaged by the switch or elevator actuating roller 38 (or 38ª) provided this has been properly set. This plate 278 is mounted upon curved arms 279 and 280. The arm 279 is mounted upon a rock shaft 281. The depending arm of this bell crank lever is connected by means of a link 282 to a bolt 283 which is normally forced outward by means of a spring 284. This bolt 283 engages over a keeper or catch 285 which is attached to the cross bar 286 supporting the rails $x^5$ at the exit end of the switch. It will therefore be seen that when a car arrives upon the drop switch, its roller 38, or 38ª, will engage with the plate 278 and will depress the same. This will cause a retraction of the bolt 283 and the drop switch will be released whereupon the weight of the car will cause the depression of the switch.

Means must of course be provided for stopping the car when it arrives upon the switch and for holding the car from movement while the switch is moving downward. For this purpose we provide the brake plate 287, the plate being pivoted at its rear end upon the cross bar 259 but being formed to move vertically at its forward end. The forward end of the brake plate carries the depending detent 288 notched on its forward edge for the reception of a locking arm or lug 289 carried by the rock shaft 281. This detent is connected by means of a link 290 to an upwardly projecting arm 291 forming part of a depending latch 292 mounted upon a shaft 293. As the switch nearly reaches its fully lowered position this latching arm 292 comes in contact with a cross bar 294 attached to the members 270. This presses upward on the latching arm and draws upon the link 290 withdrawing the detent 288 from its engagement with the latching arm or lug 289. The free end of the brake plate will thus be released, releasing the brakes upon the car so that the car may be readily run off, the rails $x^6$ being arranged at a slight angle to the horizontal. As the switch moves upward again to its upper position, the detent 288 will return to its original position and engage with the latching arm or tooth 289. The beveled face of the keeper 285 will engage the extremity of the bolt 283 and force it inward so that the bolt will engage over the keeper.

The forward ends of the rails $x^6$ are provided with the cross bar 295 through which the bolt 283 is guided, and this cross bar at its ends is formed with forwardly projecting arms which engage with guides 296 carried upon the under side of the cross bar 286, these guides being of the same form previously described and guiding the rails $x^6$ into alinement with the rails $x^5$.

It will of course be obvious that means must be provided for preventing following cars from running into the space left by the depression of the switch. For this purpose we provide an automatic brake mounted in advance of the drop switch and comprising a brake plate 297 pivoted between the rails $x^5$ at the entrance of the switch, the forward end of this brake plate being free to move vertically.

Mounted upon a short shaft 298 is a rotatable member 299 having arms 300 disposed at right angles to each other and with a rearwardly projecting arm which is connected to a link 301 which in turn connects with the brake plate 297. When the switch is in its raised position one of these arms on the member 299 extends upward and the other extends out in the path of a cross piece 302 attached to the rails $x^6$. When the switch is lowered this cross piece comes in contact with the forwardly projecting arm of the member 299 and rotates this member so as to cause the elevation of the forward end of the brake plate 297. Upon the return movement of the rails $x^6$ and the cross piece 302, the cross piece will again contact with one of the outwardly projecting arms and the member 299 will be reversely rotated so as to lower the forward end of the brake plate.

The rails $x^6$ of the drop switch are adapted to aline with the rails $x^7$ which are disposed on a lower level than the rails $x^5$ and constitute an unloading section. These rails $x^7$ are connected by means of a cross piece 303 and may be connected to a return track in the manner described in the patent referred to at the beginning of this specification.

It will of course be seen that the drop switch is to a certain extent the equivalent of the elevator construction previously described and constitutes such an elevator in that it provides means for lowering the car from a higher to a lower level. It does not however provide means for raising a car from a lower to a higher level but the principles of the construction are the same as the principles used in the construction of the elevators previously described except that no raising mechanism is provided.

While we have described and illustrated the elevators of our system as being operated manually, we do not wish to be limited to this as it is obvious that in many cases it will be better to provide power actuated means for operating the elevators and merely manually control the power actuated means. Such a construction is illustrated in Fig. 16. In this figure the elevator is precisely the same as that illustrated in Fig. 7 and the related figures, and the elevator construction itself requires no further description. The only difference between the mechanism illustrated in Fig. 16 and the mechanism illustrated in Fig. 7 is in the means of applying power to the lifting levers. In this figure, 306 represents an electric motor fastened to the supporting frame. Supported in hangers 312 is a transverse shaft 308 which terminates about centrally under the supporting frame and has rigidly fastened to its end the crank arm 309 which is located centrally under the elevator. The transverse shaft 176 has keyed to it the upwardly extending arm 183 as previously described.

Rigidly fastened on shaft 308 is a gear wheel 307 which is geared to motor 306 in any suitable manner as by means of the belt or sprocket chain 310. Disposed in circuit with the motor and the source of power is a circuit breaker or switch which may have electric engagement with the contact 313 forming part of said circuit. This switch or circuit breaker has an upwardly extending handle 315 and a downwardly extending finger 316. A laterally projecting pin 317 is fastened on the wheel 307, and the object of this pin is to automatically throw out the switch or circuit breaker 314 after the elevator has reached its extreme height. When the elevator has lowered with a car, the arm 183 will take the position illustrated in dotted lines in Fig. 16 and the shaft 308 will have revolved to such position that the crank arm 309 will point in the opposite direction from that illustrated. When it is desired to elevate the car, all that is necessary for the operator to do is to close the electric switch 314 by means of the handle 315, whereupon the motor will start revolving the wheel 307, and when the elevator has reached its extreme height the pin 317 will come in contact with the finger 316 throwing out the electric switch or circuit breaker which thus disconnects the motor from the source of power and causes it to stop until the next car is lowered and is to be elevated when the above operation is repeated.

In Figs. 6 and 7 we have illustrated braking mechanism adapted to be used with the elevators shown, but in Fig. 17 we show a simpler form of braking mechanism whereby any number of cars may be braked one behind the other. This would be necessary at the terminal end of the track when several cars are used in the system. This braking system illustrated in Fig. 17 and the braking mechanism illustrated in Figs. 6 and 6$^a$ is one of the most important features of our invention.

Referring to Fig. 17, X, Y and Z show three braking sections or three car stops, all similar, and it is to be understood, of course, that any number may be added to the rear of those shown. These brakes are to a large extent the same as those shown to the left of the elevator D in Fig. 6, excepting that the automatic tripping mechanism is not used. Inasmuch as the parts of these brakes and the general operation is the same as those heretofore described no very detailed description of the brakes is necessary.

Referring to the section Z it will be seen that 320 and 321 designate transverse shafts mounted in suitable supports attached to the under face of the track rails. Mounted on these shafts are the arms 324 and 325, the upper ends of which support a brake actuating bar 323.

Located centrally between the rails and pivoted at its rear end is the brake bar 322 which is free to move up and down a short distance at its forward end. Pivoted to this brake bar near its forward end is the detent 330 which is recessed on its rear face and formed with a projecting lip or hook adapted to latch on the laterally projecting lug 331 of a bell crank 336. Fastened to the middle of shaft 320 is the downwardly projecting arm 328 connected to the downwardly projecting arm 327 of bell crank 336 by a rod 329. Thus shafts 320 and 321 rotate together.

Arms 324 and 325 are made adjustable on shafts 320 and 321 by set screws or other means for the purpose of adjusting the height of the brake actuating bar 323. These arms 324 and 325 are located on shafts 320 and 321 to one side of the middle of the shafts.

Attached to the depending arm 327 is a coil spring 335 which is rigidly supported at its forward end and which acts to draw the depending arm 327 of the bell crank lever 336 forward. The several switch sections X and Y are precisely the same in construction as the switch section Z just described and therefore the same reference numerals are used, only distinguished from the reference numerals used with relation to the switch section Z by the exponents $x$ and $y$. The downwardly depending arm 328 on shaft 320 is connected by means of the rod 333 to the latch 330$^y$, and the downwardly depending arm 328$^y$ is connected to the latch 330$^x$ by means of the rod 333$^y$. The downwardly depending arm 328$^x$ may be in turn connected by the rod 333$^w$ to another similar braking mechanism mounted rearward of the section X but not shown. The latch 330 of the section Z is connected by means of a rod 337 to oppositely disposed levers 334 pivoted at 334$^a$ so that when either one of these levers 334 is pulled, the rod 337 will be drawn forward drawing forward the lower end of the latch 330 and releasing the lug 331 as will hereafter appear.

Now when a car arrives upon this braking section, the roller 38$^b$ of the car comes in contact with the brake actuating bar 323$^x$ pressing it down, but this does not raise the brake bar 322$^x$ as it will be noticed that the detent 330$^x$ is out of engagement with the bell crank lever 326$^x$ and it does not raise the brake plate 322$^x$ but the car passes on. Likewise it passes over section Y but sets the brakes on section Z, because it will be seen that the detent 330 is in engagement with the bell crank lever 336 whereas the detents 330$^y$ and 330$^x$ were not in engagement with the lugs 331$^y$ and 331$^x$.

Now when a car is at rest on section Z and pressing down on the brake actuating bar 323, it will have pushed rearward on the rod 333, engaging detent 330$^y$ with its bell crank lever 326$^y$ which will cause the following car to raise the detent 330$^y$ and also the brake plate 322$^y$ and apply the brakes and stop the car on this section. In the same manner the following car will be stopped on section X.

When it is desired to release a car from the section Z, the operator pulls rearward on one of the levers 334 which pulls forward on the detent 330 and pulls the detent out of engagement with the lug 331 on bell crank lever 336. This allows the brake plate 322 to lower releasing the brakes and the car starts by gravity. After this car has moved off, it allows the brake actuating plate 323 to raise and the forward movement of rod 333 under the action of spring 335 releases the detent 330$^y$ allowing brake plate 322$^y$ to lower and release the brakes, allowing the car on this section to start and move forward onto the section Z while the next following car stops on the section Y, etc.

It will be seen that the end section Z will always stop any car as its detent 330 is always latched with the bell crank lever 336, and that this is always released by the levers 334 but the other brake mechanisms on sections X and Y are always operated by the car ahead.

It will be readily understood that the levers 334 project to opposite sides of the track and that the inner ends of the levers overlap below the brake plate 322 and are pivoted together so that the apparatus may be operated from either side.

It will be obvious that various modifications in the mechanism may be made without departing from the spirit of the invention, and we therefore do not limit ourselves to any specific application of this mechanism as it is obvious that it may be applied in various circumstances and to various ends. Thus while we have described our mechanism as applied to conveying dishes to and from a dining room, the mechanism might be used for a large number of different purposes and is adapted to the carriage of persons either as an amusement device or as a means of commercial transportation, or for store service uses.

In Figs. 19 and 20, we show illustrations of our brake and elevator operating mechanism as applied to a car driven by an electric current. The car illustrated is the same as that shown in Figs. 3, 4 and 5, except that the wheels are not shown as pivoted. This omission is simply made because the construction now to be described has nothing to do with the pivotal action of the axles. In this drawing, 340 designates the brake plate, as previously described, so placed that brake actuating members on the track when reached will push the brake plate upward. Mounted upon the car is an electric motor 341 of any suitable construction so geared to the car wheels as to drive the same. Mounted upon the car is a roller 342 which is adapted to engage with a third rail whereby electrical energy is transmitted to the motor. Mounted upon the framework of the car is a bar 343 which is rigidly fastened to the truck frame but is insulated therefrom. This bar 343 carries upon it a guide 344 through which passes a guide post 346. The bar 343 extends inward and is engageable with a circuit breaker or contact 345 that is insulated upon an arm 347. This circuit breaker is disposed in a circuit 348 which includes the motor and the wheel 342 and a ground.

When the car is moving along the fixed track, the roller 342 comes in contact with the power rail or third rail and conducts the current through the post 346, bar 343 and the circuit breaker 345 to the motor. Now, when the car runs on the rails where the brake actuating members are located, as previously described, the brake plate is raised and pressed up against the brake shoe 340. This applies the brakes, as previously described, and also lifts the circuit breaker or contact 345 off from bar 343 breaking the current from the motor when the brakes are applied to the car wheels. Upon a release of the brakes the shoe 340 is lowered. This allows the circuit breaker to again contact with bar 343 which thus establishes the circuit between the third rail and the motor whereupon the car starts.

What we claim is:

1. In a transportation system of the character described, an elevated track having an interruption in its course, a bodily depressible track section supported in said interruption and including rails alinable with the rails of the elevated track, means for locking said track section in its raised position, a car, coacting means on the car and track section for causing an unlocking of the track section when the car arrives thereon to permit a depression of the track section, and means for braking the car upon its arrival on the track section.

2. In a transportation system, the combination with a car having thereon a shiftable actuating member projecting below the bottom of the car, of an elevated track having an interruption in its course, a bodily depressible track section supported in said interruption, means for locking said track section in its raised position, means actuated by engagement with said member on the car for unlocking said track section upon the arrival of a car thereon, a braking device carried upon the track section in a normally inoperative position, and means actuated by said member for shifting the braking device into operative position upon engagement of said means with the member on the car.

3. In a transportation system, the combination with a car having thereon a laterally shiftable actuating member and means for adjusting said member in any one of a number of positions, of an elevated track having a plurality of interruptions, a bodily depressible track section disposed in each of said interruptions including rails adapted to aline with the rails of the elevated track, means on each track section for locking it in a raised position, and means disposed in the track section and adapted to be engaged by the member on the car to thereby cause an unlocking of the track section to permit its depression, the lock actuating means of each depressible section being disposed out of alinement with any of the other actuating means.

4. In a transportation system, the combination with a car having thereon a laterally shiftable actuating member and means for adjusting said member in any one of a number of positions, of an elevated track having a plurality of interruptions, a bodily depressible track section disposed in each of said interruptions including rails adapted to aline with the rails of the elevated track, means on each track section for locking it in a raised position, means disposed in the track section and adapted to be engaged by the member on the car to thereby cause an unlocking of the track section to permit its depression, the lock actuating means of each depressible section being disposed out of alinement with any of the other actuating means, and means operated by the actuation of the bolt withdrawing means for braking the car.

5. In a transportation system, the combination with a car having thereon a laterally shiftable actuating member and means for adjusting said member in any one of a number of positions, of an elevated track having a plurality of interruptions, a bodily depressible track section disposed in each of said interruptions including rails adapted to aline with the rails of the elevated track, means on each track section for locking it in a raised position, means disposed in the track section and adapted to be engaged by the member on the car to thereby cause an unlocking of the track section to permit its depression, the lock actuating means of each depressible section being disposed out of alinement with any of the other actuating means, and brake actuating means disposed in the track section normally depressed but movable upward into an actuating position upon an actuation of the bolt withdrawing means.

6. In a transportation system of the character described, the combination with cars, each having thereon a brake shoe and a shifting device, of an elevated track having an interruption in its course, a bodily depressible track section disposed in said interruption and including rails alinable with the rails of the elevated track, means locking said track section in its elevated position, means engaged by the actuating device on each car for unlocking said track section, and means disposed on the elevated track section in advance of the interruption for automatically engaging the brake shoe on a succeeding car when a car has arrived upon the track section.

7. In a transportation system of the character described, cars each having a brake applying shoe and an actuating device, in combination with an elevated track having an interruption in its course, a bodily depressible track section disposed in said interruption, means normally holding the track section in a raised position with its rails in alinement with the rails of the elevated section, means actuated by the arrival of a car upon the depressible track section for releasing said track section, and means disposed on the elevated track section in advance of the interruption in the track for stopping succeeding cars while the depressible track section supports a car, and means for releasing said holding means when the bodily depressible track section has been elevated to its normal position.

8. In a transportation system of the character described, cars, each having a brake-applying shoe, and an elevator actuating member shiftable laterally into a plurality of positions, an elevated track having a plurality of interruptions in its course, a plurality of depressible track sections disposed one in each interruption, means for locking said track section in an elevated position, and means on each depressible track section to release said locking means and thereby permit the depressible track section to descend, the means on one track section being disposed out of alinement with means on the other track sections and being adapted to be engaged by the elevator actuating member on the car.

9. In a transportation system of the character described, cars each having a transverse shiftable actuating roller, and means for shifting each roller laterally to a plurality of adjusted positions, in combination with an elevated track having a plurality of interruptions in its course, a depressible track section in each of said interruptions of the elevated track, means for normally holding the depressible track sections in alinement with the elevated track section, and means actuated by engagement with the rollers upon the cars for causing the depression of the depressible track sections under the weight of a car.

10. In a transportation system of the character described, the combination with a car including wheels mounted to move laterally in curved paths, brake shoes extending over and contacting with the tops of the wheels, and a shoe depending beneath the car and extending longitudinally thereof and operatively engaged with said first-named brake-shoes to apply the brakes when the second-named shoe is raised, of a track section, and a member disposed in said track section and adapted to engage the second-named brake-shoe to raise the latter and apply the brakes to the car.

11. In a transportation system of the character described, the combination with a car having thereon braking members adapted to extend over and engage the tops of the wheels of a car, said wheels being movable laterally in curved paths and a brake shoe disposed longitudinally beneath the body of the car and operatively connected to said braking members to engage the latter with the wheels upon an elevation of the brake shoe, of a track section having therein a vertically movable brake applying member adapted when raised to engage with the brake shoe on the car, and co-acting members disposed upon the car and upon the track section for causing an elevation of the brake-applying member when the coacting members are engaged with each other.

12. In a transportation system, the combination with a car, a brake shoe disposed beneath and longitudinally of the car, braking members extending over the wheels and operatively connected with said brake shoe, and a laterally shiftable brake actuating device carried by the car to one side of the brake shoe, of a track section having therein a vertically movable brake-applying member adapted to engage with the brake shoe on the car, an actuating plate mounted beside the brake-applying member and operatively connected thereto to raise the brake-applying member when the actuating plate is lowered, said plate being adapted to be engaged by the actuating device on the car.

13. In a transportation system, the combination with a car, a brake shoe disposed beneath and longitudinally of the car, braking members extending over the wheels of the car and operatively connected with said brake shoe, and a brake actuating device carried by the car to one side of the brake shoe, of a track section having therein a vertically movable brake-applying member adapted to engage with the brake shoe on the car, an actuating plate mounted beside the brake-applying member and operatively connected thereto to raise the brake-applying member when the actuating plate is lowered, said plate being adapted to be engaged by the actuating device on the car, and means for releasing the connection between the brake-applying device and the actuating plate to permit the brake-applying member to drop and thereby release the car.

14. In a transportation system of the character described, a car, a brake-shoe attached to the car, an actuating member mounted upon the car at one side of the brake-shoe, in combination with a track section, a brake-applying member pivoted at one end and vertically movable at its other end into and out of engagement with the brake-shoe of the car, a brake-applying plate disposed in the track section and adapted to be engaged by the actuating device on the car, and to be depressed thereby, arms upon the opposite ends of the plate and supported thereby, a notched detent depending from the brake-applying member, a shaft upon which the said arms are mounted, an arm projecting from said shaft and engaging with the notch of the said detent whereby when the shaft is rocked in one direction, the detent and brake-applying member shall be raised, and means for shifting the detent out of engagement with said arm to release the brake-applying member and thereby release the car.

15. In a transportation system, the combination with a car and an elevated track, of a plurality of depressible track sections, forming part of said track, means for locking the depressible track sections in an elevated position, means actuated by the arrival of the car upon a depressible track section for unlocking said section and allowing it to fall under the weight of the car, and manually controlled means for raising each of said depressible track sections to its normal position.

16. In a transportation system, the combination with an elevated track, of a plurality of depressible track sections, forming part of the track, means for locking the depressible track sections in an elevated position, means actuated by the arrival of the car upon a depressible track section for unlocking said section and allowing it to fall under the weight of the car, manually controlled means for raising each of said depressible track sections to its normal position, and means for counter-balancing the weight of each depressible track section and the car thereon.

17. In a transportation system, the combination with an elevated track, of a plurality of depressible track sections, forming part of said track, means for locking the depressible track sections in an elevated position, means actuated by the arrival of the car upon a depressible track section for unlocking said section and allowing it to fall under the weight of the car, manually controlled means for raising each of said depressible track sections to its normal position, and adjustable means for counter-balancing the weight of each depressible track section and the car thereon.

18. In a transportation system, the combination with an elevated track, of a plurality of depressible track sections forming part of said track, means for locking the depressible track sections in an elevated position, means actuated by the arrival of the car upon a depressible track section for unlocking said section and allowing it to fall under the weight of the car, manually controlled means for raising each of said depressible track sections to its normal position, and counter-balancing springs resisting the downward movement of each depressible track section.

19. In a transportation system, the combination with an elevated track, of a plurality of depressible track sections, forming part of said track, means for locking the depressible track sections in an elevated position, means actuated by the arrival of the car upon a depressible track section for unlocking said section and allowing it to fall under the weight of the car, manually controlled means for raising each of said depressible track sections to its normal position, counter-balancing springs resisting the downward movement of each track section, and means for adjusting the tension of said springs.

20. In a transportation system of the character described, an elevated track section, having an interruption in its course, a depressible track section disposed in said interruption, means normally holding the depressible track with its rails in alinement with the rails of the elevated track, means for releasing said holding means to permit the depression of the depressible track section upon the arrival of a car thereon, and manually-controlled means for lifting the depressible track section to its normal position, and including a depressible platform.

21. In a transportation system of the character described, an elevated track section having an interruption in its course, a depressible track section disposed in said interruption, means normally holding the depressible track with its rails in alinement with the rails of the elevated track, means for releasing said holding means to permit the depression of the depressible track section upon the arrival of a car thereon, and manually-controlled means for lifting the depressible track section to its normal position and including a depressible platform and a lifting lever.

22. In a transportation system of the character described, an elevated track section having an interruption in its course, a depressible track section disposed in said interruption, means normally holding the depressible track with its rails in alinement with the rails of the elevated track, means for releasing said holding means to permit the depression of the depressible track section upon the arrival of a car thereon, and manually-controlled means for lifting the depressible track section to its normal position and including oppositely disposed depressible platforms and oppositely disposed depressible levers, one for each platform.

23. A transportation system of the character described, including an elevated track, extending in a closed path, said track being inclined downward from one terminal thereof to the other terminal thereof and being interrupted at a plurality of points in its course, one of said interruptions being disposed at the junction of the lowest portion of the track with the highest, a plurality of depressible track sections disposed one in each of said interruptions, means holding the depressible track section on a level with the elevated track, means automatically actuated by the arrival of a certain car upon a certain depressible track section for automatically lowering that section, and manually-controlled means for lifting said depressible sections to a level with the main track.

24. In a transportation system of the character described, an elevated track having a plurality of interruptions along its course, said track at its point of beginning being relatively high and extending downward to its point of ending, said track extending in a closed path so that the terminals of the track shall be in alinement with each other, but one terminal being at a lower level than the other terminal, a plurality of automatically depressible track sections disposed in the interruptions of the track and adapted each to be depressed by the arrival thereon of a certain car, a receiving and discharging track section disposed between the starting point of the elevated track and the end thereof, means for normally holding said track section at a level with the discharging end of the elevated track to receive cars thereon, and manually controlled means for raising the track section to a level with the starting point of the track.

25. In a transportation system of the character described, an elevated track having a plurality of interruptions along its course, said track at its point of beginning being relatively high and extending downward to its point of ending, said track extending in a closed path so that the terminals of the track shall be in alinement with each other, but one terminal being at a lower level than the other terminal, a plurality of automatically depressible track sections disposed in the interruptions of the track and adapted each to be depressed by the arrival thereon of a certain car, a receiving and discharging track section disposed between the starting point of the elevated track and the end thereof, means for normally holding said track section at a level with the discharging end of the elevated track to receive cars thereon, manually controlled means for raising the track section to a level with the starting point of the track, and means for stopping the car upon its arrival on said receiving and discharging track section to prevent the movement of the car while the track section is being raised, and means for automatically releasing said car when the track section has been raised to a level with the main track section.

26. In a transportation system of the character described, an elevated track section having an interruption therein, a depressible track section including rails adapted to aline with the rails of the elevated track, crossed angular levers pivotally connected at their upper ends to the rails of the depressible track section, said levers crossing each other and being pivotally connected at the crossing point, the outer ends of the levers being pivotally supported, a shaft, manually actuated means for rotating said shaft, operative connections between said shaft and said levers whereby upon a rotation of the shaft in one direction the levers shall be raised and upon a rotation of the shaft in another direction the levers shall be lowered to thereby lower the track section, and means resisting the depression of the track section.

27. In a transportation system of the character described, an elevated track section having an interruption therein, a depressible track section including rails adapted to aline with the rails of the elevated track, crossed angular levers pivotally connected at their upper ends to the rails of the depressible track section, said levers crossing each other and being pivotally connected at the crossing point, the outer ends of the levers being pivotally supported, a shaft, manually controlled means for rotating said shaft, operative connections between said shaft and said levers whereby upon a rotation of the shaft in one direction the levers shall be raised and upon a rotation of the shaft in another direction the levers shall be lowered to thereby lower the track section, and means yieldingly resisting the rotation of the said shaft in a direction to lower the levers and said track section.

28. In a transportation system of the character described, an elevated track section having an interruption therein, a depressible track section disposed in said interrupted portion of the track, a track section supported upon the depressible track section, disposed above the same and having rails adapted to aline with the rails of the elevated track section when the depressible track section is lowered, and means for raising and lowering said depressible track section.

29. In a transportation system of the character described, an elevated track section having an interruption therein, a depressible track section disposed in said interrupted portion of the track, a supplementary track section disposed above the depressible track section and having rails adapted to aline with the rails of the elevated track section when the depressible track section is lowered, levers operatively connected to the depressible track section whereby to raise and lower the same, and crossed levers supporting the supplementary track section and operatively connected to the first-named system of levers whereby when the depressible track section is lowered the supplementary section will be lowered into alinement with the elevated track sections and when the depressible track section is raised the supplementary section shall be raised above the level of the elevated track section.

30. In a transportation system of the character described, an elevated track section having an interruption therein, a depressible track section disposed in said interrupted portion of the track, crossed levers supporting the depressible track section, a supplementary track section disposed above the depressible track section, crossed levers connected to the first-named system of levers and to the supplementary track section and supporting the same, means resisting the downward movement of the depressible track section under the weight of a car and manually-controlled means for lifting the depressible track section.

31. In a transportation system of the character described, an elevated track section having an interruption therein, vertically disposed supporting members defining said interrupted portion of the track section, a depressible track section adapted to aline with the elevated track section and disposed in said interruptions, oppositely disposed pairs of crossed levers operatively connected at their upper ends to the depressible track section and at their lower ends operatively connected to said standards, a shaft, operative connections between the said shaft and said levers, and a weight-receiving platform connected to the shaft to rotate the latter to thereby raise the depressible track section.

32. In a transportation system of the character described, an elevated track section having an interruption therein, vertically disposed supporting members defining said interrupted portion of the track section, a depressible track section adapted to aline with the elevated track section and disposed in said interruption, oppositely disposed pairs of crossed levers operatively connected at their upper ends to the depressible section and at their lower ends operatively connected to said standards, a shaft, operative connections between the said shaft and said levers, a weight receiving platform operatively connected to the shaft to rotate the latter to thereby raise the depressible track section, and a lever supported above the platform and operatively connected to said shaft.

33. A transportation system of the character described, an elevated track having an interruption in its course, a depressible track section mounted in said interruption, a shaft, an arm on the shaft, levers operatively connecting said arm with the depressible track section whereby upon a rotation of the shaft in one direction the track section shall be lowered, and upon a rotation of the shaft in the opposite direction the track section shall be raised, springs operatively connected to said shaft to resist its rotation in a direction to lower the depressible track section, and manually-controlled means operatively connected to the shaft to rotate the shaft in a direction to raise the track section.

34. In a transportation system of the character described, an elevated track section having an interruption in its course, a depressible track section disposed in said interruption, means yieldingly resisting the depression of the track section, manually-controlled means for raising the depressible track section to a level with the elevated track section, means for locking the depressible track section in its elevated position in alinement with the rails of the elevated track section, and car-operated means for releasing said locking means.

35. In a transportation system of the character described, an elevated track system interrupted in its course, a track section disposed in said interruption and depressible under the weight of a car, means for raising said track section after being depressed to a level with the elevated track section, means for locking said depressible track section in its lowered position, automatic means for locking the depressible section in its raised position, and car-operated means for releasing said locking means.

36. In a transportation system of the character described, an elevated track system interrupted in its course, a track section disposed in said interruption and depressible under the weight of a car, means for raising said track section after being depressed to a level with the elevated track section, means for locking said depressible track section in its lowered position, automatic means for locking the depressible section in its raised position, car-operated means for releasing said locking means, car-brake actuating means disposed upon the depressible track section, means for throwing said car-brake actuating means into operative position upon the arrival of a car upon the depressible track section, and means for automatically releasing said car-brake actuating means when the depressible track section, after having been lowered, is again raised to a level with the elevated track section.

37. In a transportation system of the character described, an elevated track section having an interruption in its course, a depressible track section disposed in said interruption and adapted to be lowered under the weight of a car, a car-brake actuating mechanism disposed upon the depressible track section, a plurality of successive car-brake actuating devices disposed upon the elevated track section in advance of the interruption, means for actuating the car-brake operating devices on the depressible track section upon the arrival of a car thereon, means for shifting the car-brake actuating devices next adjacent to the interruption into operative position upon a depression of the depressible track section, and means for shifting successive car-brake actuating devices into operative position upon the engagement of cars with said successive car-brake actuating devices.

38. In a transportation system of the character described, an elevated track section having an interruption in its course, a depressible track section disposed in said interruption and adapted to be lowered under the weight of a car, a car-brake actuating mechanism disposed upon the depressible track section, a plurality of successive car-brake actuating devices disposed upon the elevated track section in advance of the interruption, means for actuating the car-brake operating devices on the depressible track section upon the arrival of a car thereon, means for shifting the car-brake actuating devices next adjacent to the interruption into operative position upon a depression of the depressible track section, means for shifting successive car-brake actuating devices into operative position upon the engagement of cars with said successive car-brake actuating devices, and means for successively releasing said car-brake actuating devices upon the return of the depressible track section to its normal position.

39. The combination with an elevated track having a plurality of depressible track sections in its course and releasing means disposed in each depressible track section, the releasing means of one depressible track section being out of alinement with the releasing means of any other depressible track section, of a car for use thereon, said car having a transversely extending member, a roller mounted upon said transversely extending member and laterally shiftable thereon, a lever operatively engaging the roller to shift it, and an indicator over which the free end of the lever moves whereby to indicate the proper position of the roller to engage the releasing device on any particular depressible track section.

40. In a transportation system of the character described, a track section having an interruption in its course, a depressible track section disposed in said interruption, means for braking a car disposed upon the depressible track section, and means disposed in advance of the interruption for halting a car for a predetermined period and then permitting the car to pass onward to thereby reduce the speed of all cars passing onto the depressible track section to uniformity.

41. In a transportation system of the character described, an elevated track section having an interruption in its course, a depressible track section disposed in said interruption, means disposed immediately in advance of the interruption for braking a car if the depressible track section is lowered, and means disposed in advance of the last named braking means for halting a car for a predetermined period to thereby reduce the speeds of all cars to uniformity prior to their passage into engagement with the first named braking means.

In testimony whereof we affix our signatures in presence of two witnesses.

AARON HORTON. [L. S.]
SALYER HORTON. [L. S.]

Witnesses:
A. W. SPLITT,
ABE. BROWN.

Copies of this patent may be obtained for five cents each, by addressing the "Commissioner of Patents, Washington, D. C."